United States Patent
Kumazawa

(10) Patent No.: US 10,948,891 B2
(45) Date of Patent: *Mar. 16, 2021

(54) MOTOR DRIVER WITH MULTIPURPOSE PIN

(71) Applicant: SEMICONDUCTOR COMPONENTS INDUSTRIES, LLC, Phoenix, AZ (US)

(72) Inventor: Fumio Kumazawa, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,957

(22) Filed: Nov. 4, 2019

(65) Prior Publication Data
US 2020/0064801 A1  Feb. 27, 2020

Related U.S. Application Data

(63) Continuation of application No. 16/114,455, filed on Aug. 28, 2018, now Pat. No. 10,503,134, which is a (Continued)

(51) Int. Cl.
*G05B 19/042* (2006.01)
*H02P 27/08* (2006.01)
(Continued)

(52) U.S. Cl.
CPC ............ *G05B 19/0421* (2013.01); *H02P 1/04* (2013.01); *H02P 27/08* (2013.01); *G05F 1/56* (2013.01); *H02P 23/0027* (2013.01)

(58) Field of Classification Search
CPC ........ H01R 12/727; H05K 1/14; H05K 3/308; G05B 11/28; G05B 19/00; H02P 27/04;
(Continued)

(56) References Cited

U.S. PATENT DOCUMENTS 6,320,822 B1  11/2001 Okeya
8,994,310 B2 *  3/2015 Wu .................... G05B 19/00
                                                 318/490
(Continued)

FOREIGN PATENT DOCUMENTS

JP      H08178693 A   7/1996
JP      2010028670 A  2/2010
JP      2012165520 A  8/2012

OTHER PUBLICATIONS

Rohm Semiconductor, "Multifunction Single-phase Full-wave Fan Motor Driver," DC Brushless Fan Motor Drivers, Jun. 19, 2015, Rev. 001, 31 pages.

*Primary Examiner* — Antony M Paul
(74) *Attorney, Agent, or Firm* — Adam R. Stephenson, Ltd.

(57) ABSTRACT

A motor driver system. Implementations may include: a motor driver configured to couple with a motor where the motor driver comprises a multipurpose pin. A controller may be included coupled with the motor driver through at least the multipurpose pin. The motor driver during an enable mode, may be configured to receive serial data from the controller and to send serial data to the controller using the multipurpose pin during a normal operation mode of the motor driver. The motor driver may be configured to output a frequency generator (FG) signal to the controller using the multipurpose pin during the normal operation mode of the motor driver.

20 Claims, 20 Drawing Sheets

Related U.S. Application Data continuation-in-part of application No. 15/654,365, filed on Jul. 19, 2017, now Pat. No. 10,084,397.

(60) Provisional application No. 62/368,949, filed on Jul. 29, 2016.

(51) Int. Cl.
*H02P 1/04* (2006.01)
*G05F 1/56* (2006.01)
*H02P 23/00* (2016.01)

(58) Field of Classification Search
CPC .... H02P 27/06; H02P 1/04; H02P 1/00; H02P 27/08; H02P 6/085; H02P 3/00; H02P 6/00; H02P 21/00; H02P 41/00; G06F 9/45; H02H 7/08; B60L 15/20
USPC ....... 361/791; 318/599, 400.01, 400.02, 700, 318/701, 727, 779, 799, 800, 801, 430, 318/811; 307/412; 327/108; 345/110; 365/185.23
See application file for complete search history.

(56) References Cited

U.S. PATENT DOCUMENTS

| | | |
|---|---|---|
| 10,503,134 B2* | 12/2019 | Kumazawa ............... H02P 1/04 |
| 2007/0200518 A1 | 8/2007 | Verge |
| 2007/0220499 A1* | 9/2007 | Bannatyne ........... H01R 13/665 717/140 |
| 2010/0020625 A1 | 1/2010 | Morimoto et al. |
| 2011/0029137 A1 | 2/2011 | Yasohara et al. |
| 2013/0145084 A1 | 6/2013 | Hiromatsu et al. |

* cited by examiner

| Mode judgment time | | Normal mode enable | Setting mode enable | Driving enable (conventional) | Driving enable (trial) | Driving enable (final) |
|---|---|---|---|---|---|---|
| Normal mode | | L | L | L | L | L |
| | | L | L | H | L | L |
| | | H | L | L | L | L |
| | | H | L | H | L | H |
| Setting mode | | L | H | L | L | L |
| | | L | H | H | L | L |
| | | L | H | L | H | L |
| | | L | H | H | H | H |

| ENABLE | BUSY | SELSO | Motor Driver State |
|---|---|---|---|
| L | L | L | FG Logic Output (Interface: Disable) |
| L | L | H | Not Occurred Normally |
| L | H | L | Communication Start Detected (Interface: Disable) |
| L | H | H | Not Occurred Normally |
| H | L | L | FG Logic Output (Interface: Enable) |
| H | L | H | Communication End Judged (Interface: Enable) |
| H | H | L | Communication Start Detected (Interface: Enable) |
| H | H | H | Communication Ongoing (Interface: Enable) |

FIG. 12

MOTOR DRIVER WITH MULTIPURPOSE PIN

CROSS REFERENCE TO RELATED APPLICATIONS

This application is a continuation application of the earlier U.S. Utility patent application to Kumazawa entitled "Motor Driver with Multipurpose Pin," application Ser. No. 16/114,455, filed Aug. 28, 2018, now pending, which application is a continuation-in-part application of the earlier U.S. Utility patent application to Harashimata et al. entitled "Motor Driver with Multipurpose Pin," application Ser. No. 15/654,365, filed Jul. 19, 2017, issued as U.S. Pat. No. 10,084,397 on Sep. 25, 2018, which application claimed the benefit of the filing date of U.S. Provisional Patent Application 62/368,949, entitled "Multi-Function Frequency Generation Pin" to Harashimata et al. which was filed on Jul. 29, 2016, the disclosures of each of which are hereby incorporated entirely herein by reference.

BACKGROUND

1. Technical Field

Aspects of this document relate generally to motor drivers. More specific implementations involve drivers for electrical motors.

2. Background

A motor driver couples to a motor to provide one or more control signals to the motor to govern operation of the motor. The particular signals sent by the motor driver depend on the type of motor being controlled and/or the control mode being used to operate the motor.

SUMMARY

Implementations of a motor driver system may include: a motor driver configured to couple with a motor where the motor driver comprises a multipurpose pin. A controller may be included coupled with the motor driver through at least the multipurpose pin. The motor driver during an enable mode, may be configured to receive serial data from the controller and to send serial data to the controller using the multipurpose pin during a normal operation mode of the motor driver. The motor driver may be configured to output a frequency generator (FG) signal to the controller using the multipurpose pin during the normal operation mode of the motor driver.

Implementations of motor driver systems may include one, all, or any of the following:

The motor driver, at the end of the enable mode, may be configured to wait during a synchronization period before terminating sending serial data to or receiving serial data from the controller.

The motor driver may further include an interface including a communication controller, an edge detector, and a busy signal generator operatively coupled together and coupled with an inverter. The inverter may be coupled with the multipurpose pin. A selection signal generator may also be included.

The motor driver may further include an interface including a communication controller coupled with an output of an enable signal generator, the busy signal generator, and the inverter. The edge detector may be positive edge detector.

The enable signal generator may include a first inverter coupled with an output of the busy signal generator and a second inverter coupled with an output of a selection sign signal generator. A not-AND (NAND) gate may be included that may include a first input coupled to an output of the first inverter, a second input coupled to an output of the second inverter, a third input coupled to an output of a frequency generator logic unit, and an output coupled with a multiplexer. A third inverter may be included that includes an input coupled to the output of the frequency generator logic unit and an output coupled with the multiplexer where the multiplexer includes a control input and an output. A flip-flop may be included that includes a data input coupled to the output of the multiplexer and an output coupled to the control input of the multiplexer and an output of the enable signal generator. The flip-flop may be configured to generate an enable signal in response to receiving an output signal from the multiplexer.

The selection signal generator may include a first inverter coupled with an output of a frequency generator logic unit and a second inverter coupled with the output of the busy signal generator. A first NAND gate may be included that has a first input coupled with an output of the first inverter and has a second input coupled to an output of the second inverter. A first AND gate may be included that has a first input coupled to an output of the first NAND gate and a second input coupled to the output of the enable signal generator. A second AND gate may be included which has a first input to the output of the busy signal generator and a second input coupled to the output of the enable signal generator. A multiplexer may be included which has a first input coupled to the output of the first AND gate, a second input coupled to the output of the second AND gate, and a control input. A flip-flop may be coupled to the output of the multiplexer and to an output coupled with the control input where the flip-flop may be configured to generate a selection signal generator output signal in response to receiving an output signal from the multiplexer.

The busy signal generator may include an inverter coupled with an output of the communication controller and a first AND gate having a first input coupled with an output of the inverter and a second input coupled with an output of an enable signal generator. A second AND gate may be included having a first input coupled with an output of the edge detector an a second input coupled with the output of the enable signal generator. A multiplexer may be included and coupled with an output of the first AND gate and an output of the second AND gate where the multiplexer includes a control input. A flip-flop may be included coupled with an output of the multiplexer and the flip-flop may have an output coupled with the control input. The flip-flop may be configured to generate a busy signal output in response to receiving an output signal from the multiplexer.

Implementations of a motor driver system may include a motor driver configured to coupled with a motor, the motor driver including a multipurpose pin. A controller may be included coupled with the motor driver through at least the multipurpose pin. The motor driver may include a communication controller, an edge detector, an enable signal generator, a frequency generator logic unit, a selection signal generator, and a busy signal generator operatively coupled together and coupled with an inverter. The inverter may be coupled with the multipurpose pin.

Implementations of a motor driver system may include one, all, or any of the following:

The motor driver, during an enable mode, may be configured to receive serial data from the controller and to send serial data to the controller using the multipurpose pin during a normal operation mode of the motor driver. The motor driver may be configured to output a frequency generator (FG) signal to the controller using the multipurpose pin during the normal operation mode of the motor driver.

The motor driver, at the end of the enable mode, may be configured to wait during a synchronization period before terminating sending serial data or receiving serial data from the controller.

The enable signal generator my include a first inverter coupled with an output of the busy signal generator and a second inverter coupled with an output of the selection signal generator. A NAND gate may be included having a first input coupled to an output of the first inverter, a second input coupled to an output of the second inverter, a third input coupled to an output of the frequency generator unit, and an output coupled with a multiplexer. A third inverter may be included that includes an input coupled to the output of the frequency generator logic unit and an output coupled with the multiplexer. The multiplexer may include a control input and an output. A flip-flop may be included that includes a data input coupled to the output of the multiplexer. The flip-flop may include a data input coupled to the output of the multiplexer where the flip-flop has an output coupled to the control input of the multiplexer and an output of the enable signal generator. The flip-flop may be configured to generate an enable signal in response to receiving an output signal from the multiplexer.

The selection signal generator may include a first inverter coupled with an output of the frequency generator logic unit and a second inverter coupled with the output of the busy signal generator. A first NAND gate may be included having a first input coupled with an output of the first inverter and a second input coupled to an output of the second inverter. A first AND gate may be include having a first input coupled to an output of the first NAND gate and a second input coupled to the output of the enable signal generator. A second AND gate may be included having a first input coupled to the output of the busy signal generator and a second input coupled to the output of the enable signal generator. A multiplexer may be included having a first input coupled to the output of the first AND gate, a second input coupled to the output of the second AND gate, and a control input. A flip-flop may be included coupled to the output of the multiplexer and to an output coupled with the control input. The flip-flop may be configured to generate a selection signal generator output signal in response to receiving an output signal from the multiplexer.

The busy signal generator may include an inverter coupled with an output of the communication controller and a first AND gate having a first input coupled with an output of the inverter and a second input coupled with an output of the enable signal generator. A second AND gate may be included having a first input coupled with an output of the edge detector and a second input coupled with the output of the enable signal generator. A multiplexer may be included coupled with an output of the first AND gate and an output of the second AND gate. The multiplexer may include a control input. A flip-flop may be coupled with an output of the multiplexer and may include an output coupled with the control input. The flip-flop may be configured to generate a busy signal output in response to receiving an output signal from the multiplexer.

Implementations of motor drivers and motor driver systems like those disclosed herein may utilized implementations of a method of driving a motor. Implementations of the method may include providing a motor driver configured to couple with a motor. The motor driver may include a multipurpose pin coupling a controller with the motor driver through at least the multipurpose pin. The method may include, using the motor driver, receiving serial data from the controller using the multipurpose pin and sending serial data to the controller using the multipurpose pin during a normal operation mode of the motor driver. The method may also include outputting a frequency generator (FG) signal to the controller using the multipurpose pin during the normal operation mode of the motor driver.

Implementations of the method may include one, all, or any of the following:

The method may further include waiting, using the motor driver at the end of an enable mode, during a synchronization period before terminating sending serial data to or receiving serial data from the controller.

Receiving serial data from the controller may further include beginning serial transmission of data by first setting an ENABLE signal to high, followed by simultaneously setting a BUSY signal to high, and a Selection Signal Generator Output (SELSO) to high.

Sending serial data to the controller may further include first setting a BUSY signal to low and setting a Selection Signal Generator Output (SELSO) to low while an ENABLE signal is low thereby creating a synchronization period between when serial data transmission ends and the normal operation mode of the motor begins.

An interface may be coupled with the multipurpose pin. The method may further include, using the interface, sensing beginning of serial data communication to the controller and sensing ending of serial data communication to the controller. The method may also include synchronizing the serial data communication with the FG signal transmitted by the multipurpose pin during the beginning and ending of serial data communication using the interface.

Sensing beginning of serial data communication to the controller and sensing ending serial data communication may both further include using an edge detector comprised in the interface to sense an edge of the FG signal.

The method may further include providing an output of the edge detector to a busy signal generator, and setting a BUSY signal to one of a HIGH value or a LOW value in response to the output of the edge detector using the busy signal generator. The method may also include using the BUSY signal to create a synchronization period between when serial data transmission ends and the normal operation mode of the motor driver begins.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 4 is a table of input and output signal relationships in accordance with various implementations;

FIG. 12 is a truth table of motor operation signal states occurring in various implementations;

DESCRIPTION

This disclosure, its aspects and implementations, are not limited to the specific components, assembly procedures or method elements disclosed herein. Many additional components, assembly procedures and/or method elements known in the art consistent with the intended motor drivers will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such motor drivers, and implementing components and methods, consistent with the intended operation and methods.

Disclosed herein are various motor driver implementations that provide for multi-functional serial control of a motor driver using a single multipurpose pin of an electrical component package of the motor driver. The electrical component package may at least partially contain the motor driver and may include one or more pins (including, for example, the single multipurpose pin) as electrically conductive paths for coupling devices outside of the electrical component package to the motor driver. The motor driver may be at least partially contained within the electrical component package. The motor driver may be operable to couple to other devices such as a motor that may be driven by the motor driver and/or a controller that may control at least some operations and/or functions of the motor driver. In some implementations, the motor driver may be operable to, via the multipurpose pin, output a FG signal and input (or output) serial data for storing data to the motor driver (or reading data from the motor driver). In some implementations, the motor driver may be further operable to, via the multipurpose pin, determine a mode of operation for the motor driver desired by a controller coupled to the motor driver via the multipurpose pin. Enabling the motor driver to perform multiple operations via the single multipurpose pin may reduce a size of the motor driver or of the electrical component package, reduce a power consumption of the motor driver, reduce a manufacturing cost for manufacturing the motor driver, and/or providing increased flexibility in implementing the motor driver to control a motor.

Figure 1:
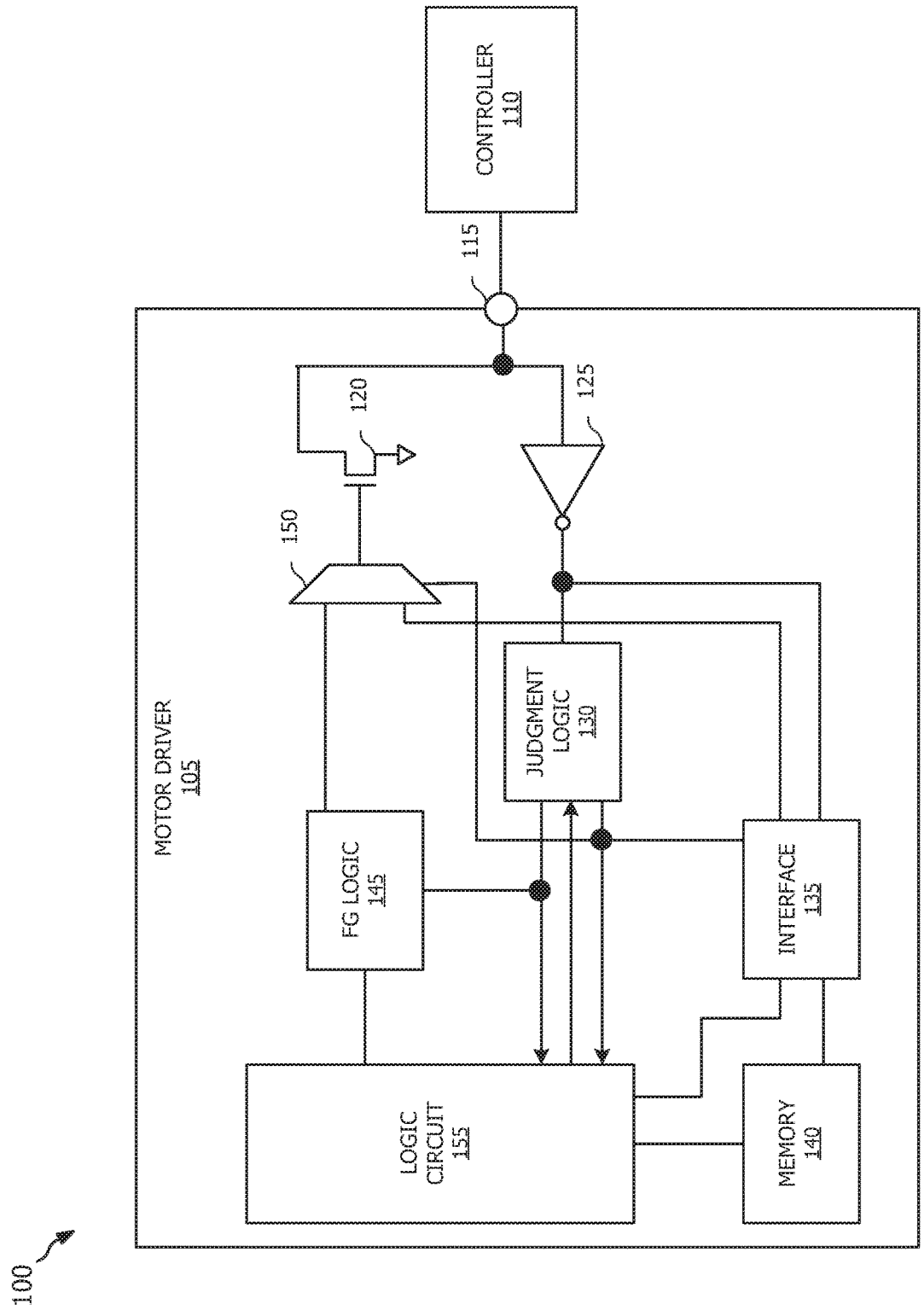
FIG. 1 is a schematic diagram of a system implementing a motor driver in accordance with various implementations.

Turning now to FIG. 1, a schematic diagram of an implementation of a system 100 implementing a motor driver 105 in accordance with various implementations is illustrated. The motor driver 105 may be coupled to, or may be operable to couple to, a controller 110, a motor (not shown), and one or more other components (not shown) that may receive output from, or provide input to, the motor driver 105. In at least some implementations, the motor driver 105 may be coupled to the controller 110 via a multipurpose pin 115. The multipurpose pin 115 may enable the motor driver to receive input (e.g., such as serial data) from the controller 110 and provide an output to the controller 110. In some implementations, the multipurpose pin 115 may be referred to as a FG pin. The multipurpose pin 115 (and correspondingly, the motor driver 105) may be described as having a normal operation mode and a setting operation mode. The motor driver 105 may determine whether the multipurpose pin 115 should operate in the normal operation mode or the setting operation mode at least partially based on whether a prescribed signal is received at the multipurpose pin 115 within a period of time allotted for receipt of a mode control signal. The period of time allotted for receipt of a mode control signal may, for example, begin and extend from a time at which the motor driver transitions from a powered-off state to a powered-on state.

As illustrated in FIG. 1, the motor driver 105 may include transistor 120, inverter 125, judgment logic 130, interface 135, memory 140, FG logic 145, multiplexer 150, and logic circuit 155. In various implementations, the motor driver 105 may further include one or more other elements (not shown) that may be operable to enable driving of the motor by the motor driver 105 (for example, by receiving and/or processing input, processing and/or transmitting output, etc.). In some implementations, the inverter 125 may couple an input of the judgment logic 130 and the interface 135 to the multipurpose pin 115. An output of the multiplexer 150 may be further coupled to the multipurpose pin 115 via the transistor 120. The transistor 120, in some implementations (such as shown in FIG. 1), may be a field effect transistor (FET) configured in an open-drain configuration in which a drain terminal of the transistor 120 is coupled to the multipurpose pin 115, a source terminal of the transistor 120 is coupled to a ground voltage potential, and a gate terminal of the transistor 120 is coupled to an output of the multiplexer 150. In other implementations, the transistor 120 may be of any suitable construction or style and may be configured according to any suitable configuration.

In some implementations, the interface 135 may be further coupled to the memory 140, logic circuit 155, judgment logic 130, and to a signal input of the multiplexer 150. The memory 140 may be coupled to the interface 135 and the logic circuit 155. The judgment logic 130 may be further coupled to the logic circuit 155, a control input of the multiplexer 150, and the FG logic 145. The FG logic 145 may be further coupled to the logic circuit 155 and a signal input of the multiplexer 150.

As discussed above, in various implementations the motor driver 105 may include at least a normal operation mode and a setting operation mode. Operation in the normal operation mode or the setting operation mode may be signaled to the motor driver 105 at least via the multipurpose pin 115 (e.g., signaled by the controller 110). In some implementations, the signaling may be indicated by receipt of the prescribed signal (e.g., a signal having a prescribed pattern or sequence of bits) by the motor driver 105 via the multipurpose pin 115. The judgment logic 130 may determine whether the prescribed signal is included in any signaling received by the motor driver 105 via the multipurpose pin 115. For example, the judgment logic 130 may monitor the multipurpose pin 115 for input within a predetermined period of time following powering on of the motor driver 105 and/or the system 100. The predetermined period of time may be, for example, about 5 milliseconds (ms), about 7 ms, about 10 ms, or any other suitable time period that allows for receipt of the prescribed signal and that may be determined according to a particular construction of an electrical circuit (e.g., an integrated circuit) that includes the motor driver 105.

When the judgment logic 130 determines that the prescribed signal is present in an input signal received by the motor driver 105 at the multipurpose pin 115 during the predetermined period of time, the judgment logic 130 may output a setting mode enable signal. In some implementations, the setting mode enable signal may indicate to at least one other component in the motor driver 105 that the motor driver 105 is to operate in the setting operation mode. When the motor driver 105 operates in the setting operation mode, the interface 135 may receive input from the multipurpose pin 115 via the inverter 125 such that a value of the input when received at the interface 135 is an inverse of a value of the input when received at the multipurpose pin 115. The interface 135, in some implementations, may provide the input received from the inverter 125 to the memory 140 for storage by the memory 140 as stored data. The stored data may be, in some implementations, an output duty cycle (e.g., a pulse width modulation (PWM) duty cycle), a minimum speed, a soft start (e.g., gradual start) time, a soft switch width, a lock protection time, a tachometer selection signal, a lock detection signal, or other configurable features or functions of the motor driver 105 or relating to operation of the motor to which the motor driver 105 is coupled. In some implementations, the interface 135 may further provide the input received by the interface 135 to the logic circuit 155 (e.g., as serial data) for use by the logic circuit, for example, for trial driving of the motor.

In some implementations, the logic circuit 155 may read the stored data from the memory 140 and output the stored data back to the controller 110 via the multipurpose pin 115 for verification that the stored data is correct (e.g., such that the data was not altered or corrupted from an intended value in the storing process). For example, the logic circuit 155 may read the stored data from the memory 140 and transmit the stored data to the interface 135. In other implementations, the interface 135 may read the stored data from the memory 140 and output the stored data back to the controller 110 via the multipurpose pin 115 in addition to, or in place of, the logic circuit 155. The interface 135 may transmit the stored data to the multiplexer 150 for output to the controller 110 via the multipurpose pin 115 and transistor 120. In some implementations, the control input of the multiplexer 150 may be coupled to the judgment logic 130 such that the setting mode enable signal output by the judgment logic 130 controls selection of an input of the multiplexer 150 for output by the multiplexer 150. For example, when the setting mode enable signal is high (e.g., the motor driver 105 is in the setting operation mode) the multiplexer 150 may output an input received from the interface 135 (e.g., such as the stored data as discussed above).

When the judgment logic 130 determines that the prescribed signal is not present in the input signal received by the motor driver 105 at the multipurpose pin 115 during the predetermined period of time, the judgment logic 130 may output a normal mode enable signal. In some implementations, the normal mode enable signal may indicate to at least one other component in the motor driver 105 that the motor driver 105 is to operate in the normal operation mode. When the motor driver 105 operates in the normal operation mode, the FG logic 145 may receive input from the logic circuit 155 and provide an output at least partially based on the received input to the multiplexer 150 for output via the multipurpose pin 115 and transistor 120. The output, in some implementations, may provide information about a state of the motor coupled to the motor driver 105. For example, the output may indicate a rotational state of the motor.

Figure 2:
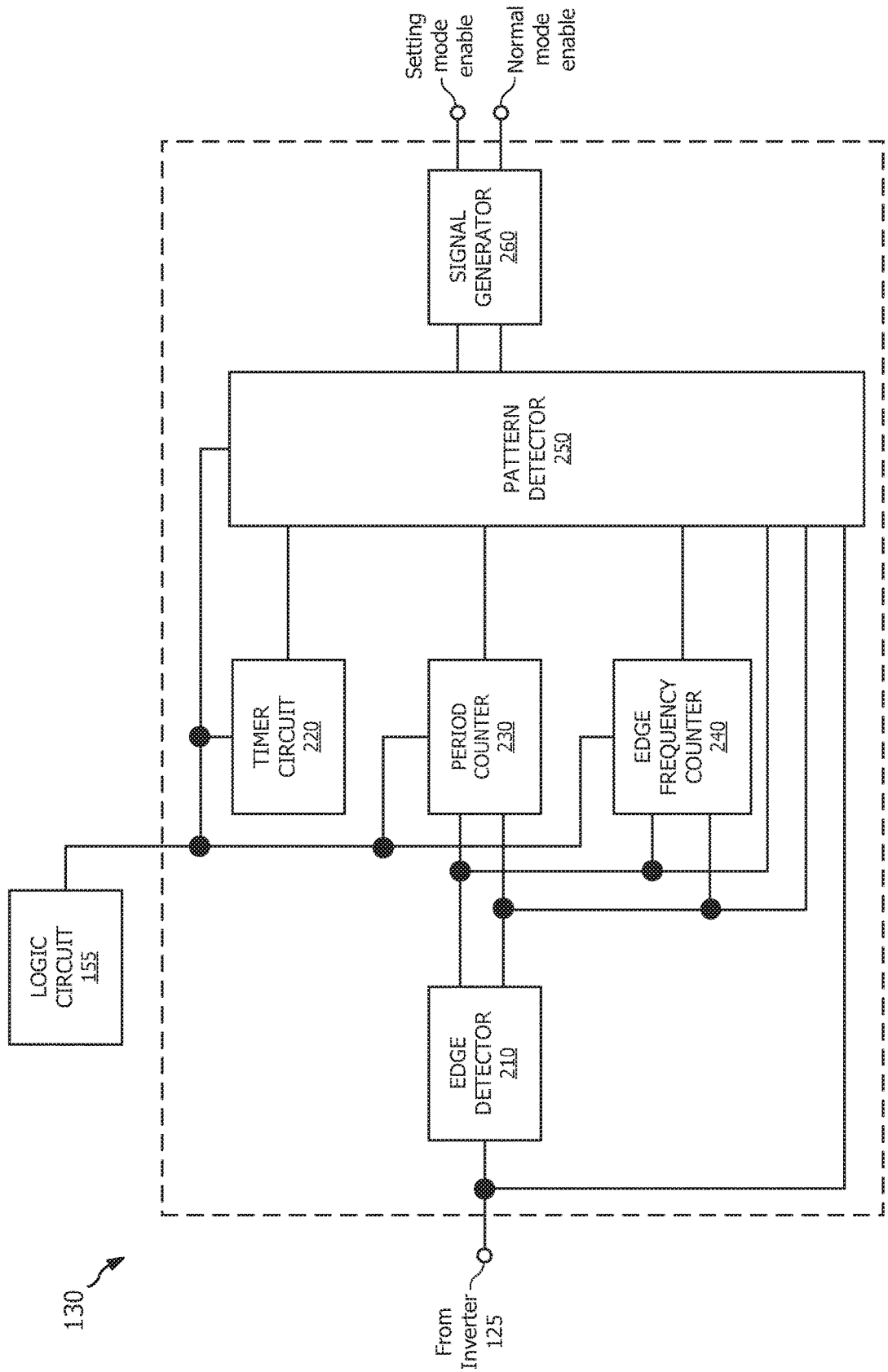
FIG. 2 is a schematic diagram of judgment logic in accordance with various implementations.

Turning now to FIG. 2, a schematic diagram of the judgment logic 130 in accordance with various implementations is shown. In some implementations, the judgment logic 130 may comprise an edge detector 210, a timer circuit 220, a period counter 230, an edge frequency counter 240, a pattern detector 250, and a signal generator 260. The judgment logic 130 may be coupled to the logic circuit 155 and may receive a judgment start signal from the logic circuit 155. The judgment start signal, in some implementations, indicates to the judgment logic 130 (and correspondingly, to the timer circuit 220, period counter 230, edge frequency counter 240, and pattern detector 250) to begin determining whether the prescribed signal is received by the judgment logic 130 within the predetermined period of time. When the timer circuit 220 receives the judgment start signal from the logic circuit 155, the timer circuit 220 may initiate a timer or a counter (e.g., a timer beginning at a predetermined time and counting down to zero or a timer beginning at zero and counting up to the predetermined time) to enable the judgment logic 130 to determine whether the prescribed signal is received within the predetermined time. When the timer circuit 220 determines that the predetermined time has expired (e.g., when the timer reaches zero or the predetermined time), the timer circuit 220 may output a timeout signal to the pattern detector 250 indicating that the predetermined time has expired. The timeout signal, in some implementations, may indicate to the pattern detector 250 to cease detecting whether the prescribed signal is received by the judgment logic 130 until the pattern detector 250 receives another judgment start signal.

The judgment logic 130 may receive input from the inverter 125 at the edge detector 210. The input may be, for example, a multi-bit binary signal such that the signal includes positive edges (transitions from a binary "0" or low to a binary "1" or high) and negative edges (transitions from a binary "1" or high to a binary "0" or low). Based on the input, the edge detector 210 may determine whether the edge of the signal is a positive edge (e.g., a rising edge) or a negative edge (e.g., a falling edge). The edge detector 210 may provide an output indicating whether a positive edge or a negative edge is detected in the input to the period counter 230, edge frequency counter 240, and the pattern detector 250. The period counter 230, in some implementations, may begin a counter or timer upon receipt of a signal indicating a detected positive edge in the input received by the judgment logic 130. When the period counter 230 receives a signal indicating a detected negative edge in the input received by the judgment logic 130, the period counter 230 may stop the counter or timer and provide a count value or time of the period of the input received by the judgment logic 130 to the pattern detector 250.

The edge frequency counter 240 may count a frequency of edge changes in the input received by the judgment logic 130. For example, when the edge frequency counter 240 receives the judgment start signal, the edge frequency counter 240 may reset a count value to zero. The edge frequency counter 240 may then begin incrementing the count value by 1 for each signal received by the edge frequency counter 240 indicating a detected positive edge or negative edge in the input received by the judgment logic 130. The pattern detector 250 may receive the judgment start signal, timeout signal, count value or time of the period, and edge frequency count and, from receipt of the judgment start signal until receipt of the timeout signal, may determine whether the prescribed signal is received by the judgment logic 130. The pattern detector 250 may perform the determination or detection at least partially according to the count value or time of the period and the edge frequency count. When the prescribed pattern is detected within the predetermined period of time, the pattern detector 250 may provide a signal to the signal generator 260 indicating that the prescribed pattern has been detected. When the prescribed pattern is not detected within the predetermined period of time, the pattern detector 250 may provide a signal to the signal generator 260 indicating that the prescribed pattern has not been detected. Based on the signals received from the pattern detector 250, the signal generator 260 may generate and output the setting mode enable signal and/or the normal mode enable signal.

Figure 3:
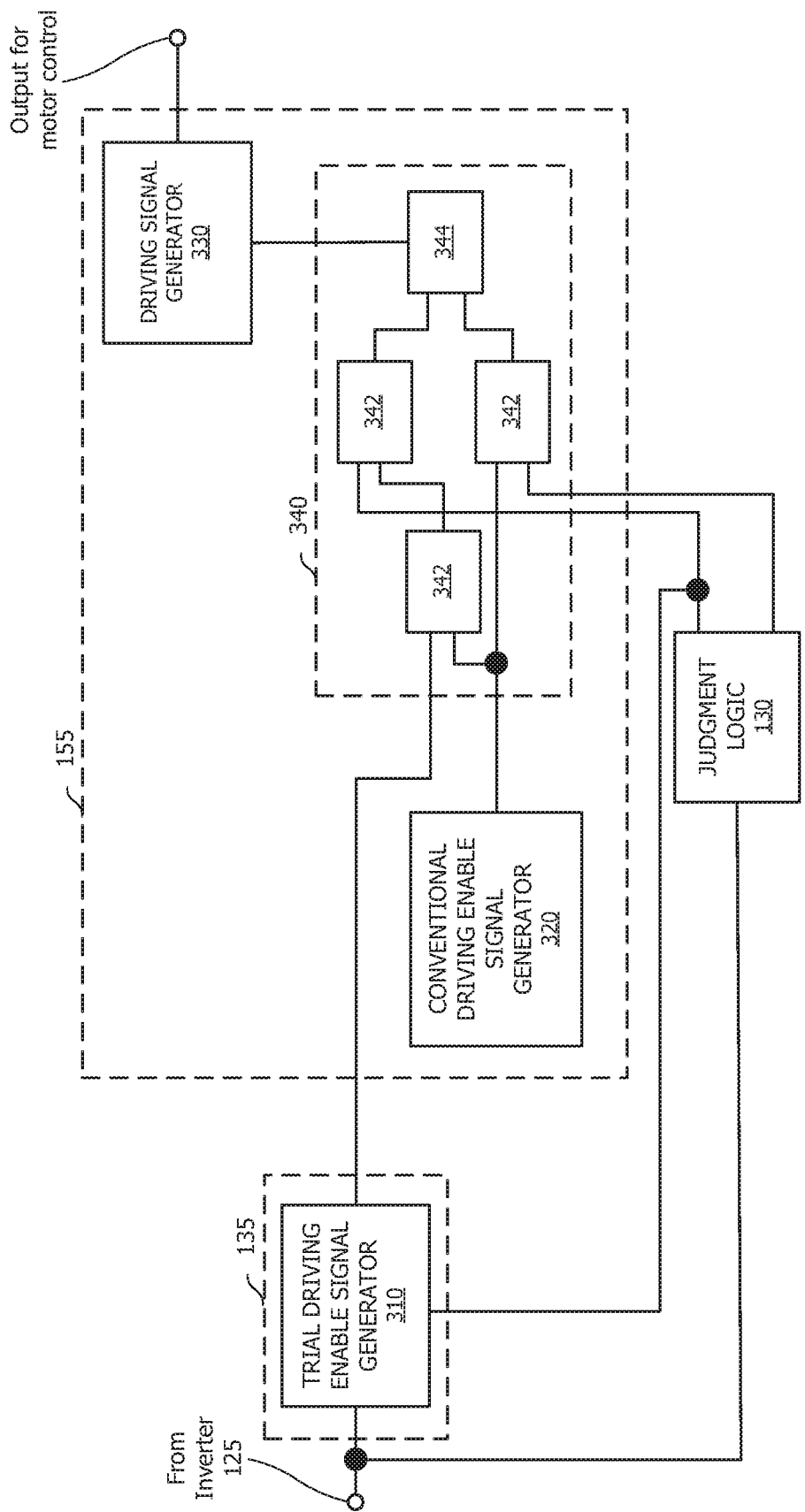
FIG. 3 is a schematic diagram of an interface and logic circuit in accordance with various implementations.

Turning now to FIG. 3, a schematic diagram of the interface 135 and logic circuit 155 in accordance with various implementations is shown. In some implementations, the interface 135 may include a trial driving enable signal generator 310. In some implementations, the logic circuit 155 may include a conventional driving enable signal generator 320, a driving signal generator 330, and an enable signal controller 340. The enable signal controller 340, in some implementations, may comprise a plurality of digital logic AND gates 342 and a digital logic OR gate 344. When the interface 135 receives an input signal from the inverter 125 of FIG. 1 and the motor driver 105 is operating in the setting operation mode, the trial driving enable generator may generate a trial driving enable signal at least partially based on the input signal received from the inverter 125 and may provide the trial driving enable signal to the enable signal controller 340. In an implementation, the conventional driving enable signal generator 320 may generate a conventional driving enable signal and provide the conventional driving enable signal to the enable signal controller 340. In an implementation, the enable signal controller 340 may further receive the setting mode enable signal and normal mode enable signal from the judgment logic 130. Each of the signals received by the enable signal controller 340 may be a binary signal and the enable signal controller 340 may generate a final driving enable signal according to the AND gates 342 and OR gate 344. FIG. 4 illustrates a table of input and output signal relationships for the enable signal controller 340 in accordance with various implementations. Returning to FIG. 3, the enable signal controller 340 may provide the final driving enable signal to the driving signal generator 330 and the driving signal generator may generate a driving signal for output by the logic circuit 155 to control a motor.

Figure 5:
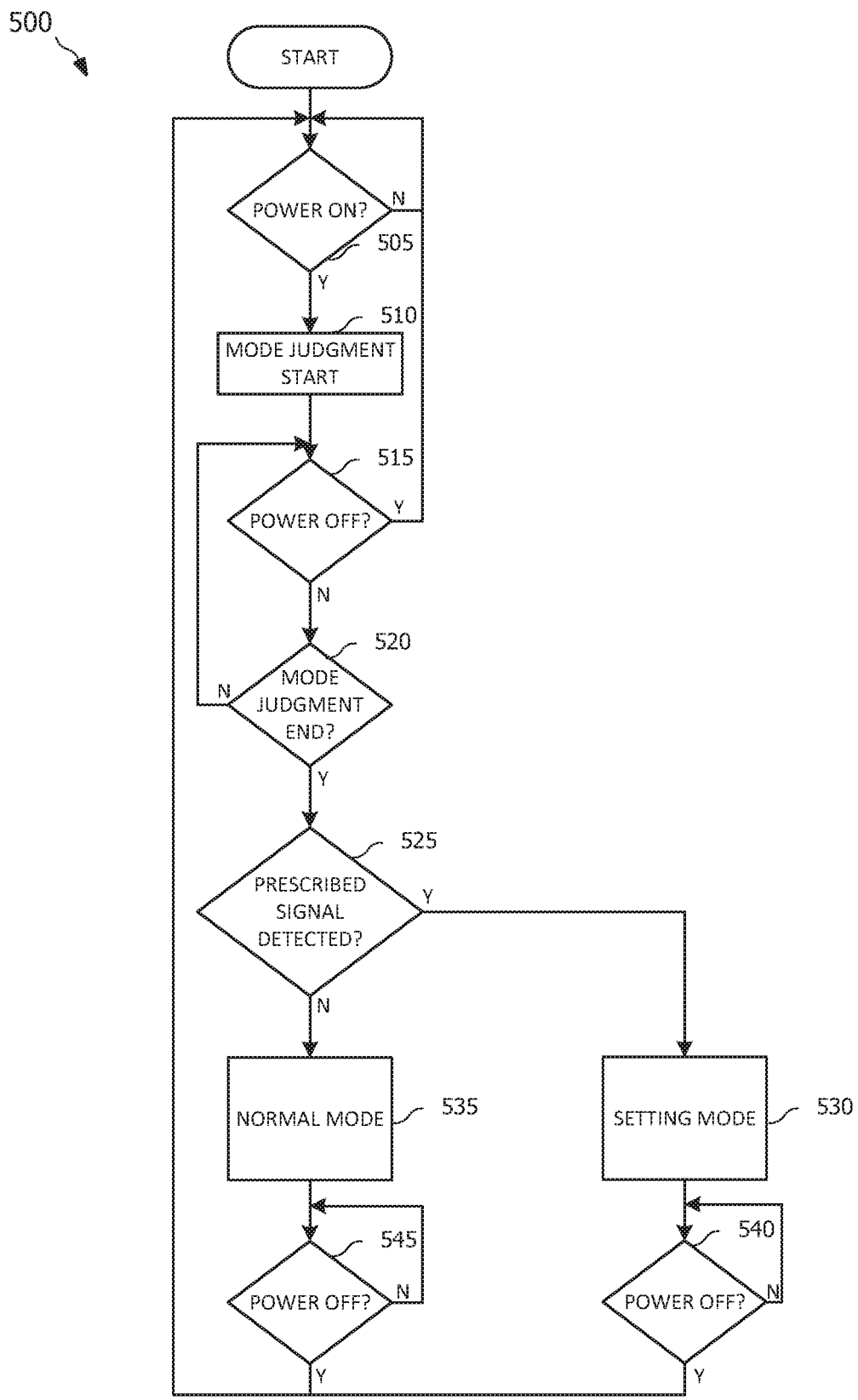
FIG. 5 is a flowchart of a method for motor driver operation mode selection in accordance with various implementations.

Turning now to FIG. 5, a flowchart of a method 500 for motor driver operation mode selection in accordance with various implementations is shown. The method 500 may be implemented, for example, by the motor driver 105 (e.g., at least partially via the judgment logic 130) to determine and/or select an operation mode (e.g., normal operation mode or setting operation mode) for the motor driver 105. At operation 505, when the motor driver 105 has been powered on (e.g., either power has been turned on when it was previously off or the motor driver 105 is restarted), the motor driver 105 proceeds to operation 510. When the motor driver has not been powered on, the method 500 remains at operation 505.

At operation 510, the motor driver 105 begins mode judgment. For example, the motor driver 105 may begin the mode judgment by transmitting a judgment start signal to one or more components of the motor driver 105 as discussed above with reference to FIG. 2. In some implementations, the mode judgment may be performed by the judgment logic 130 of the motor driver 105. In some implementations, the mode judgment may continue for about 5 ms, about 7 ms, about 10 ms, or any other suitable time period that allows for receipt of the prescribed signal and that may be determined according to a particular construction of an electrical circuit (e.g., an integrated circuit) that includes the motor driver 105. The judgment start signal may be transmitted, in some implementations, from the logic circuit 155 of the motor driver 105 to the judgment logic 130 of the motor driver 105. When the motor driver 105 has been powered off after beginning mode judgment, at operation 515 the method 500 returns to operation 505. When the motor driver 105 has not been powered off after beginning mode judgment, at operation 515 the method 500 proceeds to operation 520.

At operation 520, the method 500 determines whether mode judgment has ended. For example, mode judgment may end at the expiration of a predetermined period of time, as discussed above with reference to FIG. 2. When the mode judgment has ended, either after receipt of the prescribed signal or without receipt of the prescribed signal, the method 500 proceeds to operation 525. When the mode judgment has not ended, the method 500 returns to operation 515. At operation 525, the method 500 determines (e.g., via at least the judgment logic 130) whether the prescribed signal has been detected in input received by the motor driver 105. When the prescribed signal has been detected, the method 500 proceeds to operation 530. When the prescribed signal has not been detected, the method 500 proceeds to operation 535.

At operation 530, the motor driver 105 enters the setting operation mode. For example, after the judgment logic 130 has determined that the prescribed signal has been detected at operation 525, at operation 530 the judgment logic 130 may transmit a setting mode enable signal to one or more components of the motor driver 105 to instruct the one or more components to operate in the setting operation mode. When the motor driver 105 has been powered off after entering the setting operation mode, at operation 540 the method 500 returns to operation 505. When the motor driver 105 has not been powered off after entering the setting operation mode, at operation 540 the method 500 returns to operation 540.

At operation 535 the motor driver 105 enters the normal operation mode. For example, after the judgment logic 130 has determined that the prescribed signal has not been detected at operation 525, at operation 535 the judgment logic 130 may transmit a normal mode enable signal to one or more components of the motor driver 105 to instruct the one or more components to operate in the normal operation mode. When the motor driver 105 has been powered off after entering the normal operation mode, at operation 545 the method 500 returns to operation 505. When the motor driver 105 has not been powered off after entering the normal operation mode, the method 500 remains at operation 545.

Figure 6:
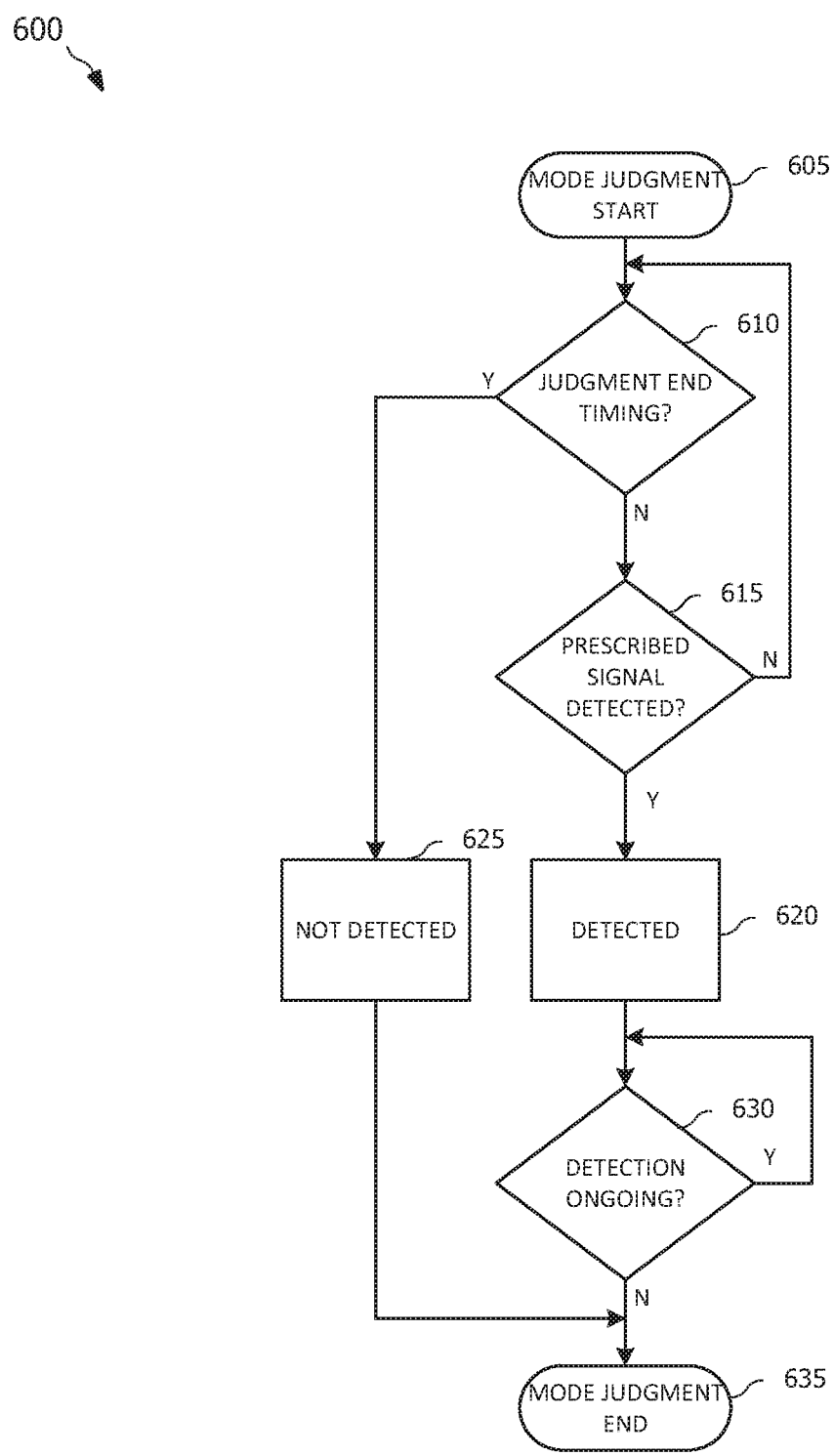
FIG. 6 is a flowchart of a method for motor driver operation mode judgment in accordance with various implementations.

Turning now to FIG. 6, a flowchart of a method 600 for motor driver operation mode judgment in accordance with various implementations is shown. The method 600 may be implemented, for example, by the judgment logic 130 to determine an operation mode (e.g., normal operation mode or setting operation mode) for the motor driver 105 according to an input signal received by the motor driver 105.

At operation 605, the judgment logic 130 begins mode judgment. For example, in response to receipt of a judgment start signal (e.g., such as a judgment start signal received from logic circuit 155, as discussed above), the judgment logic 130 may begin determining whether the prescribed signal has been (or is currently being) received by the judgment logic 130 (and correspondingly, the motor driver 105). At operation 610, the judgment logic 130 determines whether the end of a predetermined period of time for detecting whether the prescribed signal has been received (or for performing mode judgment) has occurred. The predetermined period of time may be a period of time of about 5 ms, about 7 ms, about 10 ms, or any other suitable time period that allows for receipt of the prescribed signal and that may be determined according to a particular construction of an electrical circuit (e.g., an integrated circuit) that includes the motor driver 105.

When the end of the predetermined period of time for detecting whether the prescribed signal has been received has occurred, the method 600 proceeds to operation 625. At operation 625, the judgment logic 130 determines that the prescribed signal has not been received and the method 600 proceeds to operation 635. Returning to operation 610, when the end of the predetermined period of time for detecting whether the prescribed signal has been received has not occurred, the method 600 proceeds to operation 615. At operation 615, the judgment logic 130 determines whether the prescribed signal has been detected in input received by the judgment logic 130. When the prescribed signal has been detected, the method 600 proceeds to operation 620. When the prescribed signal has not been detected, the method 600 returns to operation 610.

At operation 620, the judgment logic 130 determines that the prescribed signal has been detected during the predetermined time period. In some implementations, the prescribed signal may be included a plurality of times in a serial communication received by the judgment logic 130 and correspondingly the motor driver 105. In other implementations, it may be desirable to hold the motor driver 105 in a mode judgment operation, for example, to prevent and/or avoid the prescribed pattern being interpreted as serial communication intended for processing and/or storage by the motor driver 105. For example, in some implementations, the prescribed signal may be received by the judgment logic 130 a plurality of times (e.g., about 20 times) to provide multiple opportunities for the judgment logic 130 to detect the existence of the prescribed signal. In such implementations, the method 600 may optionally further comprise operation 630.

At operation 630, the judgment logic 130 determines whether detection of the prescribed signal is ongoing. For example, the judgment logic 130 may determine that a periodically (or aperiodically) repeating series of the prescribed signal is being received by the judgment logic 130. In such implementations, the judgment logic 130 may remain at operation 630 (e.g., in the mode judgment operation) until detection of the prescribed signal is no longer ongoing (e.g., the judgment logic 130 ceases receiving the prescribed signal). When detection is not ongoing, the method 600 may proceed to operation 635 at which the judgment logic 130 determines that mode judgment has ended.

Figure 7:
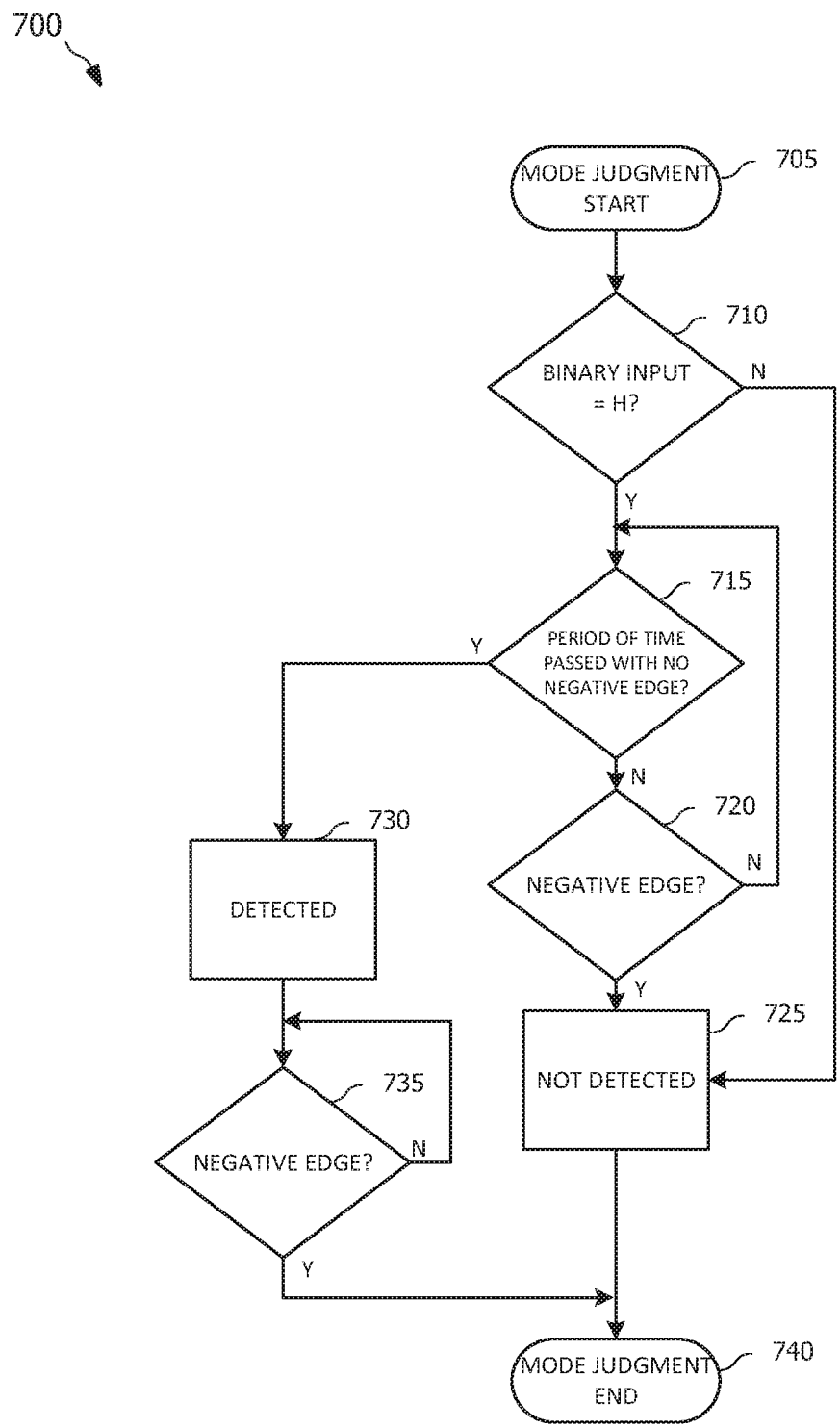
FIG. 7 is a flowchart of another method for motor driver operation mode judgment in accordance with various implementations.

Turning now to FIG. 7, a flowchart of another method 700 for motor driver operation mode judgment in accordance with various implementations is shown. The method 700 may be implemented, for example, by the judgment logic 130 to determine an operation mode (e.g., normal operation mode or setting operation mode) for the motor driver 105 according to an input signal received by the motor driver 105. The operation mode may be determined, for example, based on a binary transition in an input signal of the judgment logic 130 occurring, or not occurring, during a predefined period of time.

At operation 705, the judgment logic 130 begins mode judgment. For example, in response to receipt of a judgment start signal (e.g., such as a judgment start signal received from logic circuit 155, as discussed above). At operation 710, the judgment logic 130 may determine whether a signal at a high binary or logic level is being received by the judgment logic 130. When a signal at a high binary or logic level is being received by the judgment logic 130, the method 700 proceeds to operation 715. When a signal at a high binary or logic level is not being received by the judgment logic 130, the method 700 proceeds to operation 725.

At operation 715, the judgment logic 130 determines whether a predefined amount of time has elapsed without a negative edge in the signal (e.g., a predefined amount of time has elapsed without the signal changing from the high binary or logic level to a low binary or logic level). When the predefined amount of time has not elapsed without a negative edge in the signal (e.g., a negative edge in the signal occurring during the predefined amount of time), the method 700 proceeds to operation 720. At operation 720, the judgment logic 130 determines whether a negative edge has occurred in the signal. When a negative edge has not occurred in the signal, the method 700 returns to operation 715. When a negative edge has occurred in the signal, the method 700 proceeds to operation 725. At operation 725, the judgment logic 130 determines that the prescribed pattern has not been detected and proceeds to operation 740.

Returning now to operation 715, when the predefined amount of time has elapsed without a negative edge in the signal, the method 700 proceeds to operation 730. At operation 730, the judgment logic 130 determines that the prescribed pattern has been detected. In some implementations, the method 700 may optionally further comprise operation 735. In such implementations, the method 700 may proceed from operation 730 to operation 735. At operation 735, the judgment logic 130 determines whether a negative edge has occurred in the signal. When a negative edge has not occurred in the signal, the method 700 returns to operation

735. When a negative edge has occurred in the signal, the method 700 proceeds to operation 740. At operation 740, the judgment logic 130 determines that mode judgment has ended.

Figure 8:
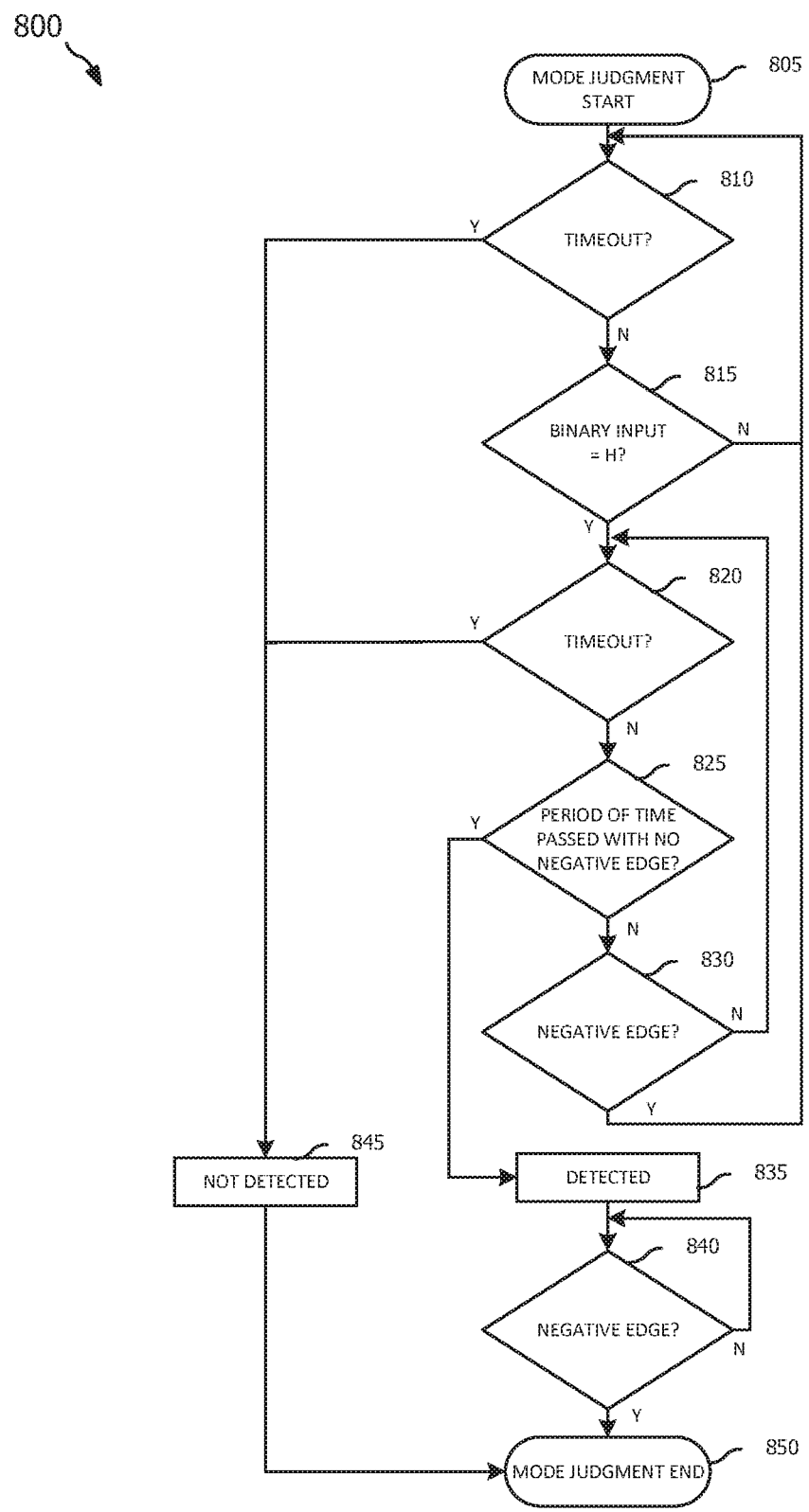
FIG. 8 is a flowchart of another method for motor driver operation mode judgment in accordance with various implementations.

Turning now to FIG. 8, a flowchart of another method 800 for motor driver operation mode judgment in accordance with various implementations is shown. The method 800 may be implemented, for example, by the judgment logic 130 to determine an operation mode (e.g., normal operation mode or setting operation mode) for the motor driver 105 according to an input signal received by the motor driver 105. The operation mode may be determined, for example, based on a binary transition in an input signal of the judgment logic 130 occurring, or not occurring, during a predefined period of time.

At operation 805, the judgment logic 130 begins mode judgment. For example, in response to receipt of a judgment start signal (e.g., such as a judgment start signal received from logic circuit 155, as discussed above). At operation 810, the judgment logic 130 may determine whether a timeout condition has been met. The timeout condition may indicate, for example, that an elapsed amount of time since beginning the mode judgment at operation 805 has exceeded the predetermined time for determining whether the prescribed signal is present. When the timeout condition has not been met, the method 800 proceeds to operation 815. When the timeout condition has been met, the method 800 proceeds to operation 845. At operation 845, the judgment logic 130 determines that the prescribed pattern has not been detected and proceeds to operation 850.

Returning to operation 815, the judgment logic 130 may determine whether a signal at a high binary or logic level is being received by the judgment logic 130. When a signal at a high binary or logic level is being received by the judgment logic 130, the method 800 proceeds to operation 820. When a signal at a high binary or logic level is not being received by the judgment logic 130, the method 800 returns to operation 810.

At operation 820, the judgment logic 130 may determine whether the timeout condition (e.g., as discussed with respect to operation 810) has been met. When the timeout condition has not been met, the method 800 proceeds to operation 825. When the timeout condition has been met, the method 800 proceeds to operation 845. At operation 825, the judgment logic 130 determines whether a predefined amount of time has elapsed without a negative edge in the signal (e.g., a predefined amount of time has elapsed without the signal changing from the high binary or logic level to a low binary or logic level). When the predefined amount of time has not elapsed without a negative edge in the signal (e.g., a negative edge in the signal occurring during the predefined amount of time), the method 800 proceeds to operation 830. At operation 830, the judgment logic 130 determines whether a negative edge has occurred in the signal. When a negative edge has not occurred in the signal, the method 800 returns to operation 820. When a negative edge has occurred in the signal, the method 800 returns to operation 810.

Returning now to operation 825, when the predefined amount of time has elapsed without a negative edge in the signal, the method 800 proceeds to operation 835. At operation 835, the judgment logic 130 determines that the prescribed pattern has been detected and proceeds to operation 840. At operation 840, the judgment logic 130 may determine whether a negative edge has occurred in the signal. When a negative edge has not occurred in the signal, the method 800 returns to operation 840. When a negative edge has occurred in the signal, the method 800 proceeds to operation 850. At operation 850, the judgment logic 130 determines that mode judgment has ended.

Figure 9:
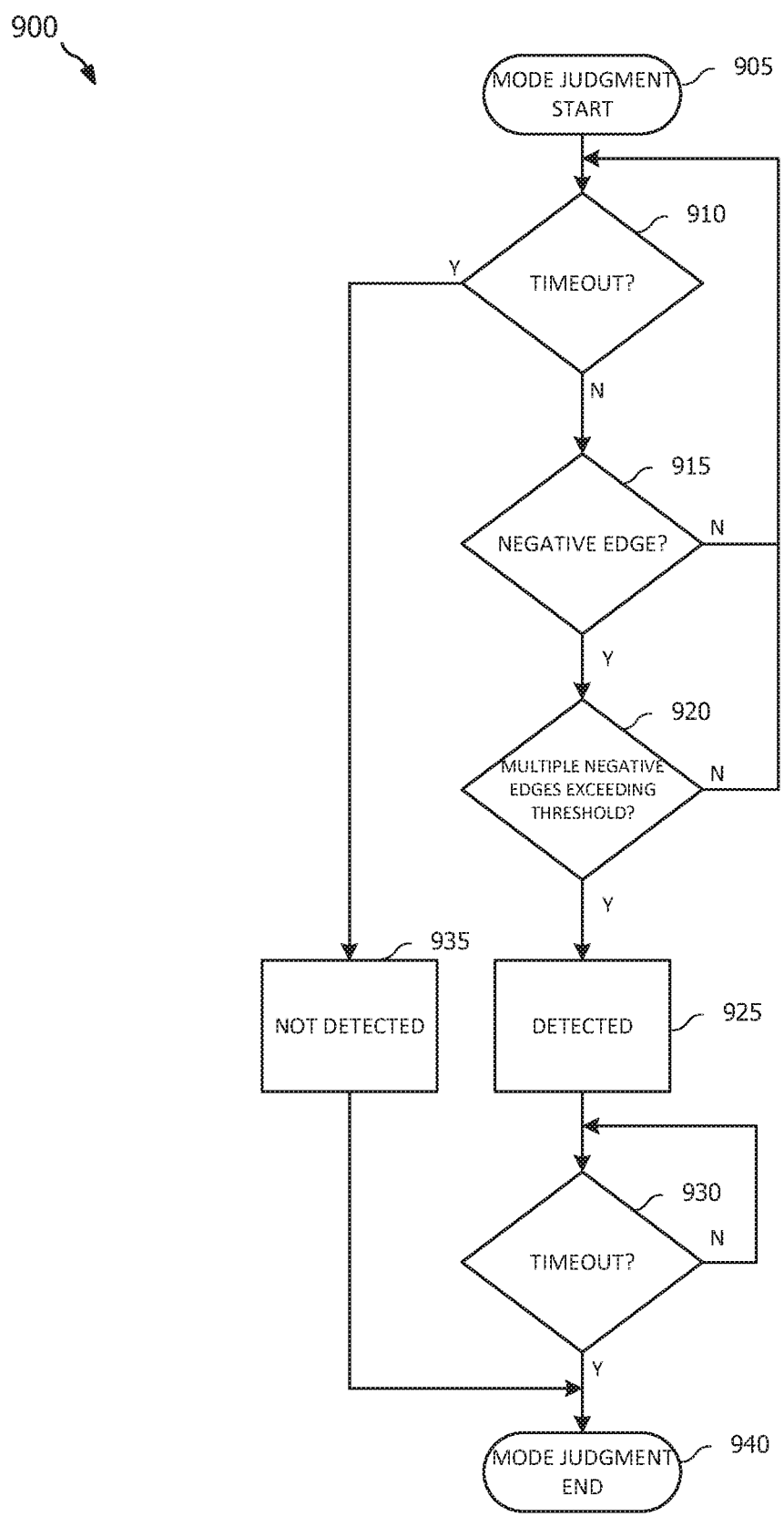
FIG. 9 is a flowchart of another method for motor driver operation mode judgment in accordance with various implementations.

Turning now to FIG. 9, a flowchart of another method 900 for motor driver operation mode judgment in accordance with various implementations is shown. The method 900 may be implemented, for example, by the judgment logic 130 to determine an operation mode (e.g., normal operation mode or setting operation mode) for the motor driver 105 according to an input signal received by the motor driver 105. The operation mode may be determined, for example, based on a plurality of binary transitions in an input signal of the judgment logic 130 occurring, or not occurring, during a predefined period of time.

At operation 905, the judgment logic 130 begins mode judgment. For example, in response to receipt of a judgment start signal (e.g., such as a judgment start signal received from logic circuit 155, as discussed above). At operation 910, the judgment logic 130 may determine whether a timeout condition has been met. The timeout condition may indicate, for example, that an elapsed amount of time since beginning the mode judgment at operation 905 has exceeded the predetermined time for determining whether the prescribed signal is present. When the timeout condition has not been met, the method 900 proceeds to operation 915. When the timeout condition has been met, the method 900 proceeds to operation 935. At operation 935, the judgment logic 130 determines that the prescribed pattern has not been detected and proceeds to operation 940.

Returning to operation 915, the judgment logic 130 may determine whether a negative edge has occurred in the input signal. When a negative edge has not occurred in the input signal, the method 900 returns to operation 910. When a negative edge has occurred in the input signal, the method 900 proceeds to operation 920. At operation 920, the judgment logic 130 determines whether a plurality of negative edges in the input signal exceeding a threshold number of negative edges have occurred. The threshold may be any number of negative edges chosen for defining the prescribed signal and a number of negative edges in the input signal included in the threshold is not limited herein. When the number of negative edges exceeding the threshold have occurred in the input signal, the method 900 proceeds to operation 925. When the number of negative edges that have occurred in the input signal has not exceeded the threshold, the method 900 returns to operation 910.

At operation 925, the judgment logic 130 determines that the prescribed pattern has been detected and proceeds to operation 930. At operation 930, the judgment logic 130 may determine whether the timeout condition (e.g., as discussed with respect to operation 910) has been met. When the timeout condition has not been met, the method 900 remains at operation 930. When the timeout condition has been met, the method 900 proceeds to operation 940. At operation 940, the judgment logic 130 determines that mode judgment has ended.

Figure 10:
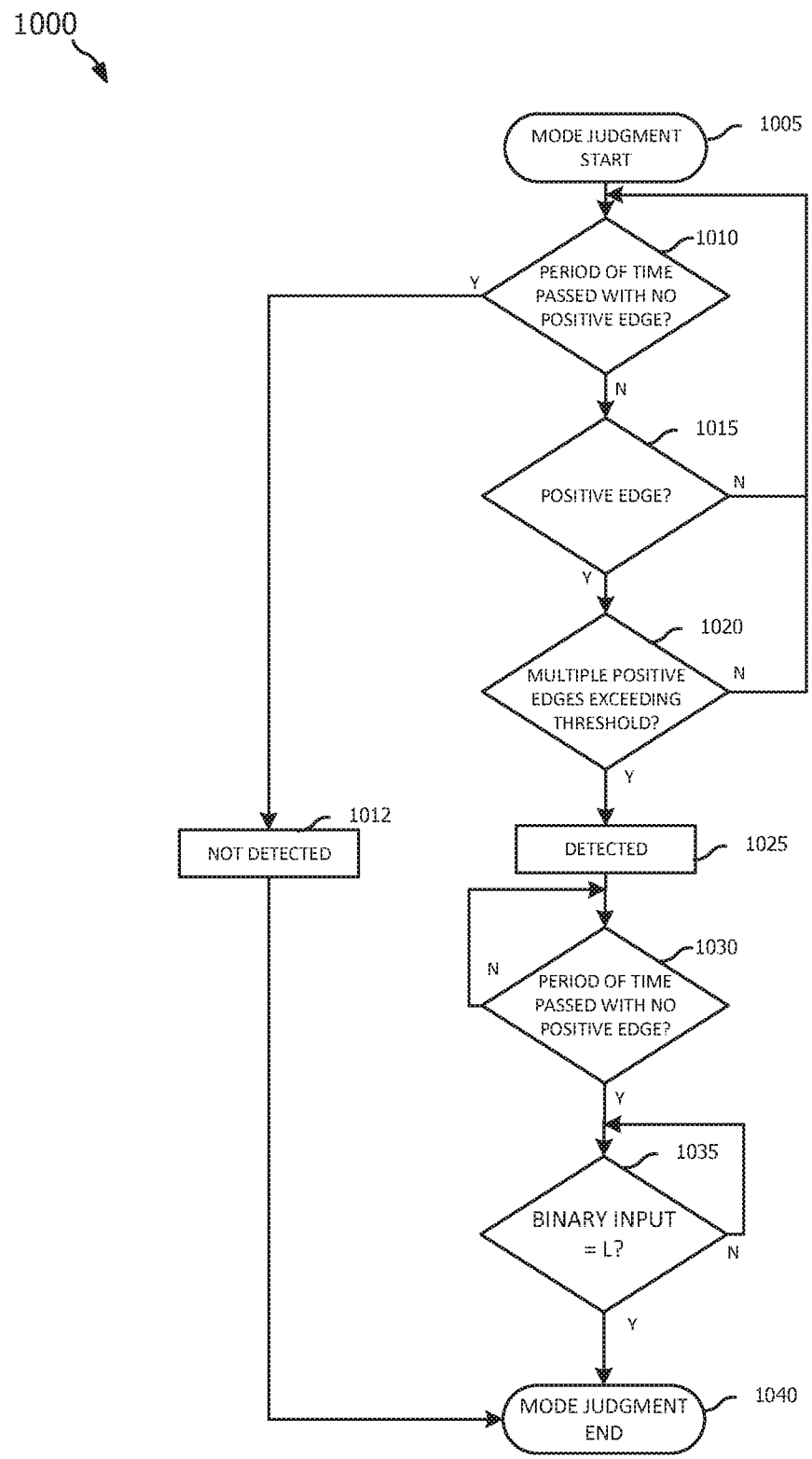
FIG. 10 is a flowchart of another method for motor driver operation mode judgment in accordance with various implementations.

Turning now to FIG. 10, a flowchart of another method 1000 for motor driver operation mode judgment in accordance with various implementations is shown. The method 1000 may be implemented, for example, by the judgment logic 130 to determine an operation mode (e.g., normal operation mode or setting operation mode) for the motor driver 105 according to an input signal received by the motor driver 105. The operation mode may be determined, for example, based on a plurality of binary transitions in an input signal of the judgment logic 130 occurring, or not occurring, during a predefined period of time.

At operation 1005, the judgment logic 130 begins mode judgment. For example, in response to receipt of a judgment start signal (e.g., such as a judgment start signal received from logic circuit 155, as discussed above). At operation 1010, the judgment logic 130 determines whether a predefined amount of time has elapsed without a positive edge in the signal (e.g., a predefined amount of time has elapsed without the signal changing from the low binary or logic level to a high binary or logic level). When the predefined amount of time has not elapsed without a positive edge in the signal (e.g., a positive edge in the signal occurring during the predefined amount of time), the method 1000 proceeds to operation 1015. When the predefined amount of time has elapsed without a positive edge in the signal, the method 1000 proceeds to operation 1012. At operation 1012, the judgment logic 130 determines that the prescribed pattern has not been detected and proceeds to operation 1040. Returning now to operation 1015, the judgment logic 130 determines whether a positive edge has occurred in the signal. When a positive edge has not occurred in the signal, the method 1000 returns to operation 1010. When a positive edge has occurred in the signal, the method 1000 proceeds to operation 1020.

At operation 1020, the judgment logic 130 determines whether a plurality of positive edges in the input signal exceeding a threshold number of positive edges have occurred. The threshold may be any number of positive edges chosen for defining the prescribed signal and a number of positive edges in the input signal included in the threshold is not limited herein. When the number of positive edges exceeding the threshold have occurred in the input signal, the method 1000 proceeds to operation 1025. When the number of positive edges that have occurred in the input signal has not exceeded the threshold, the method 1000 returns to operation 1010. At operation 1025, the judgment logic 130 determines that the prescribed pattern has been detected and proceeds to operation 1030.

At operation 1030, the judgment logic 130 determines whether a predefined amount of time has elapsed without a positive edge in the signal (e.g., a predefined amount of time has elapsed without the signal changing from the low binary or logic level to a high binary or logic level). When the predefined amount of time has not elapsed without a positive edge in the signal (e.g., a positive edge in the signal occurring during the predefined amount of time), the method 1000 remains at operation 1030. When the predefined amount of time has elapsed without a positive edge in the signal, the method 1000 proceeds to operation 1035.

At operation 1035, the judgment logic 130 may determine whether an input signal at a low binary or logic level is being received by the judgment logic 130. When an input signal at a low binary or logic level is being received by the judgment logic 130, the method 1000 proceeds to operation 1040. When a signal at a low binary or logic level is not being received by the judgment logic 130, the method 1000 remains at operation 1035. At operation 1040, the judgment logic 130 determines that mode judgment has ended.

Disclosed herein are various system implementations designed to provide for multi-functional serial control and/or monitoring of a motor driver using a single multipurpose pin of an electrical component package of a motor driver. The electrical component package (package) may at least partially contain the motor driver and may include one or more pins (including, for example, the single multipurpose pin) as electrically conductive paths for coupling devices outside of the electrical component package to the motor driver. The motor driver may be at least partially contained within the electrical component package. The motor driver may be operable to couple to other devices such as a motor that may be driven by the motor driver and/or a controller that may control at least some operations and/or functions of the motor driver, such as, by non-limiting example power, frequency, pulse width modulation, phase, and any other motor operation or control parameter. In various implementations, the motor driver may be operable to, via the multipurpose pin, output a FG signal and input (or output) serial data to the motor driver (for storing or reading data from the motor driver, respectively). In various implementations, the motor driver may be further operable to, via the multipurpose pin, determine/set/control a mode of operation of the motor driver desired by a controller coupled to the motor driver via the multipurpose pin. For example, based on serial data received by the motor driver at the multipurpose pin, the motor driver may (via at least one logic circuit of the motor driver) determine whether to operate the multipurpose pin in an enable mode during which serial communication takes place during the normal operation of the motor driver as it works to drive the motor (or other device). The use of enable mode allows the multipurpose pin to facilitate communication simultaneously or sequentially with normal operation of the motor driver without the use of additional pins or connections to set enable mode.

Figure 11:
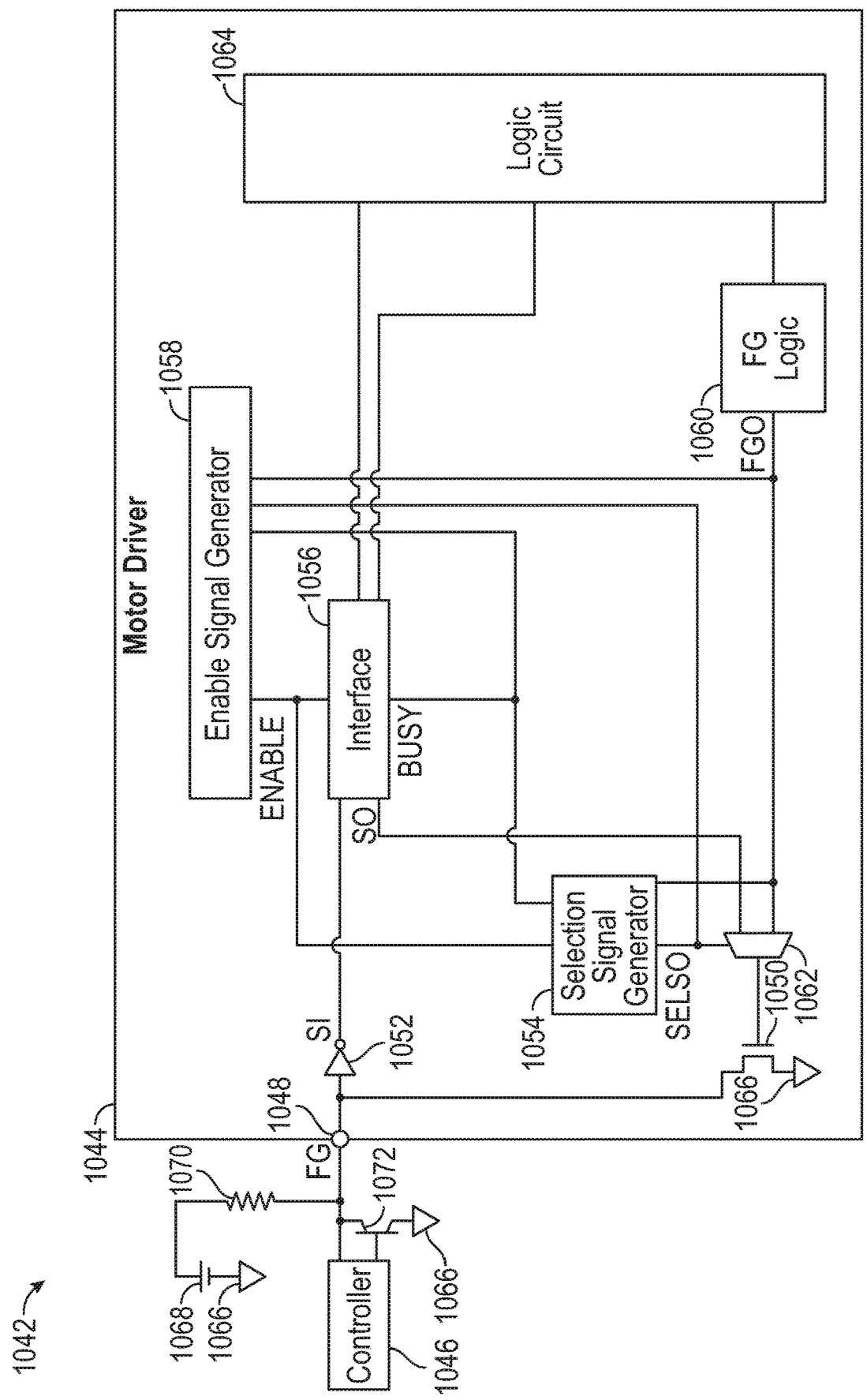
FIG. 11 is a schematic diagram of an implementation of a motor driver system.

Referring to FIG. 11, a schematic diagram of a system 1042 with a motor driver 1044 coupled with a motor controller (controller) 1046 is illustrated. The motor driver 1044 may be coupled to, or may be operable to couple to, the controller 1046 and to a motor (not shown, either through the controller 1046 or directly), and other electrical components (not shown) that may receive output from, or provide input to, the motor driver 1044. In various implementations, the motor driver 1044 may be directly (or indirectly) coupled to the controller 1046 via multipurpose pin 1048. The multipurpose pin 1048 enables the motor driver to receive input (e.g., such as serial data) from the controller 1046 and provide an output to the controller 1046. In this document, the multipurpose pin 1048 may be referred to as a FG pin (as it carries the frequency generation signal used to operate the motor in various implementations).

The multipurpose pin 1048 (and correspondingly, the motor driver 1044) may be defined as having a normal operation mode and an enable mode (communication enabled mode). In various implementations, the motor driver 1044 determines independently whether the multipurpose pin 1048 operates in the normal operation mode or the enable mode at least partially based on whether a prescribed signal is received at the multipurpose pin 1048 within a period of time allotted for receipt of a communication enable signal. In other implementations, the motor driver 1044 may utilize at least some input from the controller 1046 to determine whether to operate in the normal operation mode or the enable mode. In both implementations, during the enable mode, the motor driver 1044 continues to provide operating signals to the controller 1046 simultaneously with the movement of data into or out of the controller. During the enable mode, the multipurpose pin 1048 may receive input data from the controller 1046 such as, by non-limiting example, sensor readings (voltage, current, temperature data, etc.), control signals, or any other form of data received as serial input. During the enable mode, the multipurpose pin 1048 may be used to output data to the controller 1046 from the motor driver 1044. In various implementations, the circuitry of the motor driver 1044 may be designed to ensure that a synchronization period exists between the termination of data transfer during enable mode and the resumption of normal operation mode of the motor driver. This synchronization period appears as a delay or transitional period of time between the ceasing of data transfer and the full resumption of signals from the motor driver characteristic of normal operation mode.

As illustrated in FIG. 11, implementations of motor drivers 1044 may include transistor 1050, inverter 1052, selection signal generator 1054, interface 1056, enable signal generator 1058, FG logic 1060, multiplexer 1062, and logic circuit 1064. In various implementations, the motor driver 1044 may further include one or more other elements (shown and not shown) that are used to enable driving of the motor by the motor driver 1044 and/or communication with the controller 1046 or other motor or motor control system components. In various implementations, the inverter 1052 has an input coupled to the multipurpose pin 1048 and an output coupled to the interface 1056. An output of the multiplexer 1062 may be further coupled to the multipurpose pin 1048 via the transistor 1050. For example, the transistor 1050, in various implementations (as illustrated in FIG. 11), may be a field effect transistor (FET) configured in an open-drain configuration in which a drain terminal of the transistor 1050 is coupled to the multipurpose pin 1048, a source terminal of the transistor 1050 is coupled to a ground voltage potential 1066, and a gate terminal of the transistor 1050 is coupled to an output of the multiplexer 1062. In other implementations, the transistor 1050 may be of any transistor type and coupled to the other components of the motor driver 1044 in any of a variety of ways.

As illustrated in FIG. 11, in various implementations, the selection signal generator 1054 has a first input coupled to an ENABLE signal generated by the enable signal generator 1058, a second input coupled to a BUSY signal generated by interface 1056, a third input coupled to an FGO (frequency generator output) signal generated by FG logic 1060, and an output for a selection signal generator output (SELSO) signal generated by the selection signal generator. As illustrated, the interface 1056 has a first input coupled to the ENABLE signal, a second input coupled to the output of the inverter 1052, a third input coupled to the logic circuit 1064, a first output for a BUSY signal generated by the interface, a second output for a signal output (SO signal) coupled with a first input of the multiplexer 1062, and a third output coupled with the logic circuit 1064. The enable signal generator 1058 has a first input for receiving the BUSY signal from interface 1056, a second input for receiving the SELSO signal from the selection signal generator 1054, a third input for receiving the FGO signal from the FG logic 1060, and an output for the ENABLE signal from the enable signal generator. As illustrated, in various implementations, the multiplexer 1062 has a first input coupled with the SO signal output of the interface 1056, a second input coupled with the FGO signal of the FG logic 1060, and an output coupled to the gate terminal of the transistor 1050. In various implementations, the FG logic 1060 has an input coupled to an output of the logic circuit 1064 and an output for the FGO signal generated by the FG logic 1060.

In various implementations, the multipurpose pin 1048 is coupled to a power source 1068 via resistor 1070 and to ground voltage potential 1066 via transistor 1072. In some examples, the power source 1068 pulls the multipurpose pin 1048 up to a high state/level (voltage level) of approximately a value of an output voltage of the power source 1068 minus a voltage drop associated with the resistor 1070. In particular implementations, the controller 1046 controls the transistor 1072 to pull the multipurpose pin down to a low state/level (voltage level) by connecting the multipurpose pin 1048 to the ground voltage potential 1066.

The various components of the motor driver 1044 work together with the multipurpose pin 1048 to create a system with a plurality of logic states reflected in the truth table 1074 in FIG. 12. The truth table reflects the effects of the various components as they interact with each other and with incoming and outgoing data. The data that may be transmitted using the multipurpose pin 1048 may be, by non-limiting example, serial data, binary data, packetized data, and any other data type. As illustrated in the truth table 1074, data communication from the motor driver 1044 can begin when the ENABLE and BUSY signals are at a high level/value and the SELSO signal is at a low value. Data communications are ongoing while the ENABLE, BUSY, and SELSO signals all remain at the high level. As previously discussed, the data communication can involve data input, data output, or both data input and output to the motor driver 1044 by the controller 1046. Data communications end as the ENABLE signal is at a high level, the BUSY signal is at a low level, and the SELSO signal is at a high level. In either of the three states for ENABLE, BUSY, SELSO of {L, L, L}, {L, H, L}, and {H, L, L}, communication is not taking place and the multipurpose pin 1048 continues to support normal operation of the controller 1046 and transmit the FG signal to the controller 1046.

Figure 19:
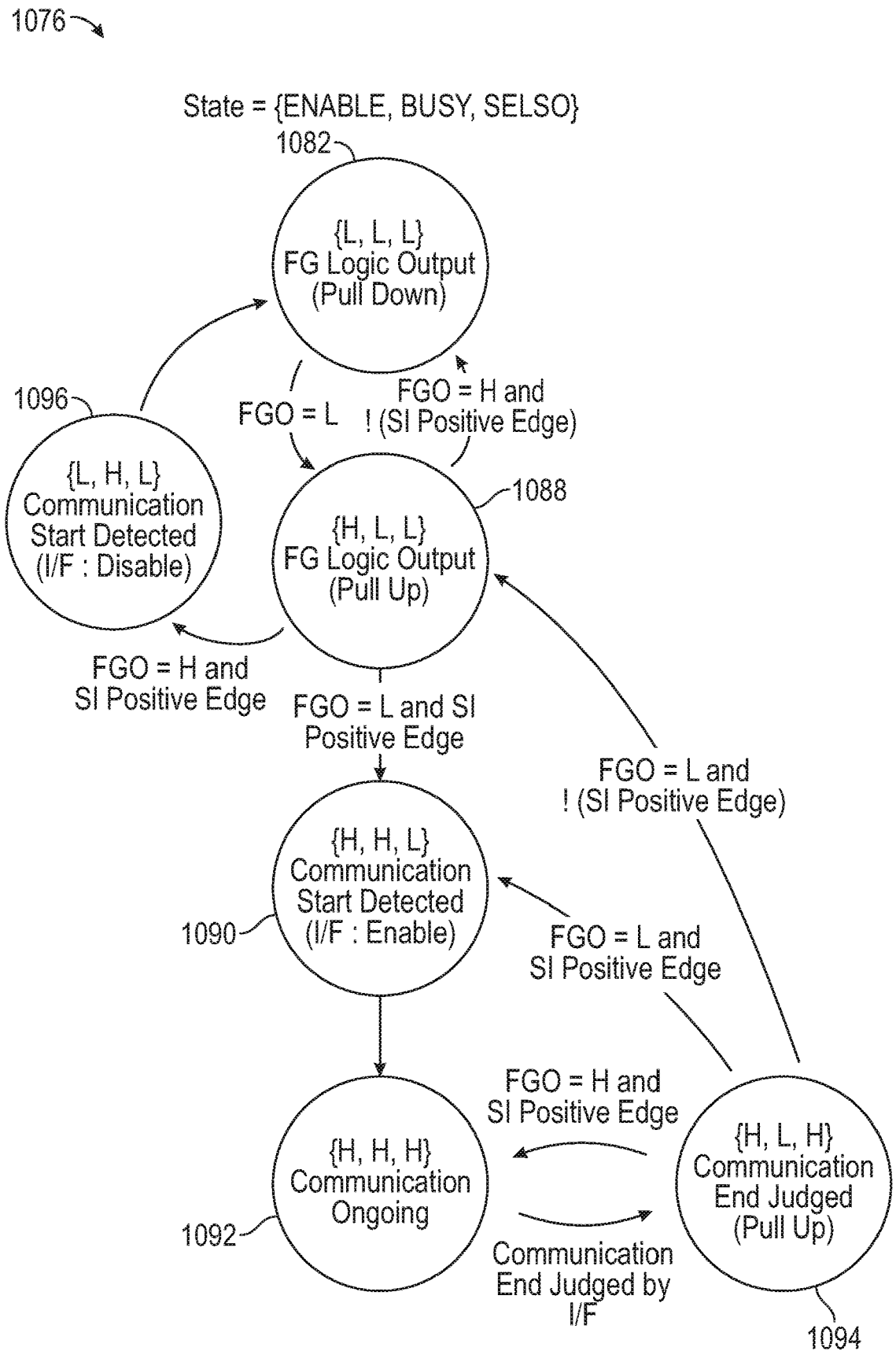
FIG. 19 is a state diagram of an implementation of a method of operating a motor driver.

The interplay of these various logic states of the motor driver 1044 is illustrated in the flow chart 1076 of FIG. 19, which also reflects the impact of the value of the FGO signal and an edge detector included in the interface 1056 on the logic process of the motor driver. This flow chart 1076 is best understood with reference to signal timing diagram 1078 in FIG. 20 which shows the various signals of the motor driver and the controller, including those passing through the multipurpose pin as a function of time on the y axis. Beginning at the Start time, the motor driver 1044 is under normal operation mode, meaning that the multipurpose pin 1048 is outputting the FG signal to the controller 1046. In this diagram, the signal marked Controller Output reflects a signal applied to the motor driver from the controller via the multipurpose pin (rather than the output of the controller to the motor). As can be observed, the FG signal regularly rises and falls, and since it may not be a binary signal in various implementations (but have some frequency and/or amplitude variation over time), the FG signal has a rise time until it reaches its maximum value, maintains the value, and then ceases. Via the logic circuit 1064, the FG logic unit 1060 controls the value of the FG signal by generates a binary signal FGO inverse to the amplitude of the FG signal (FGO is low when the FG signal is high, and high when the FG signal is low). The enable signal generator, during normal operation mode likewise generates a binary signal that corresponds with the FG signal, but it directly correlates (is not inverse). The SI signal (signal inverter) is a signal into the interface 1056 from the multipurpose pin 1048. As will be discussed at length hereafter, the SI signal is generated by the inverter 1052 from the FG signal and because the inverter does not signal until substantially the full amplitude of the FG signal has been reached, the onset of SI signal is offset from the actual start of the FG signal by the rise time of the FG signal (see indicator line 1080 in FIG. 20). During normal operation, the BUSY, SO (signal out from interface 1056), and SELSO signals are at low levels during the entire period. This normal operation mode corresponds with the top most circle 1082 in FIG. 19 for the state {L, L, L} and with the circle 1088 for the state {H, L, L}, where no communication is taking place.

Figure 20:
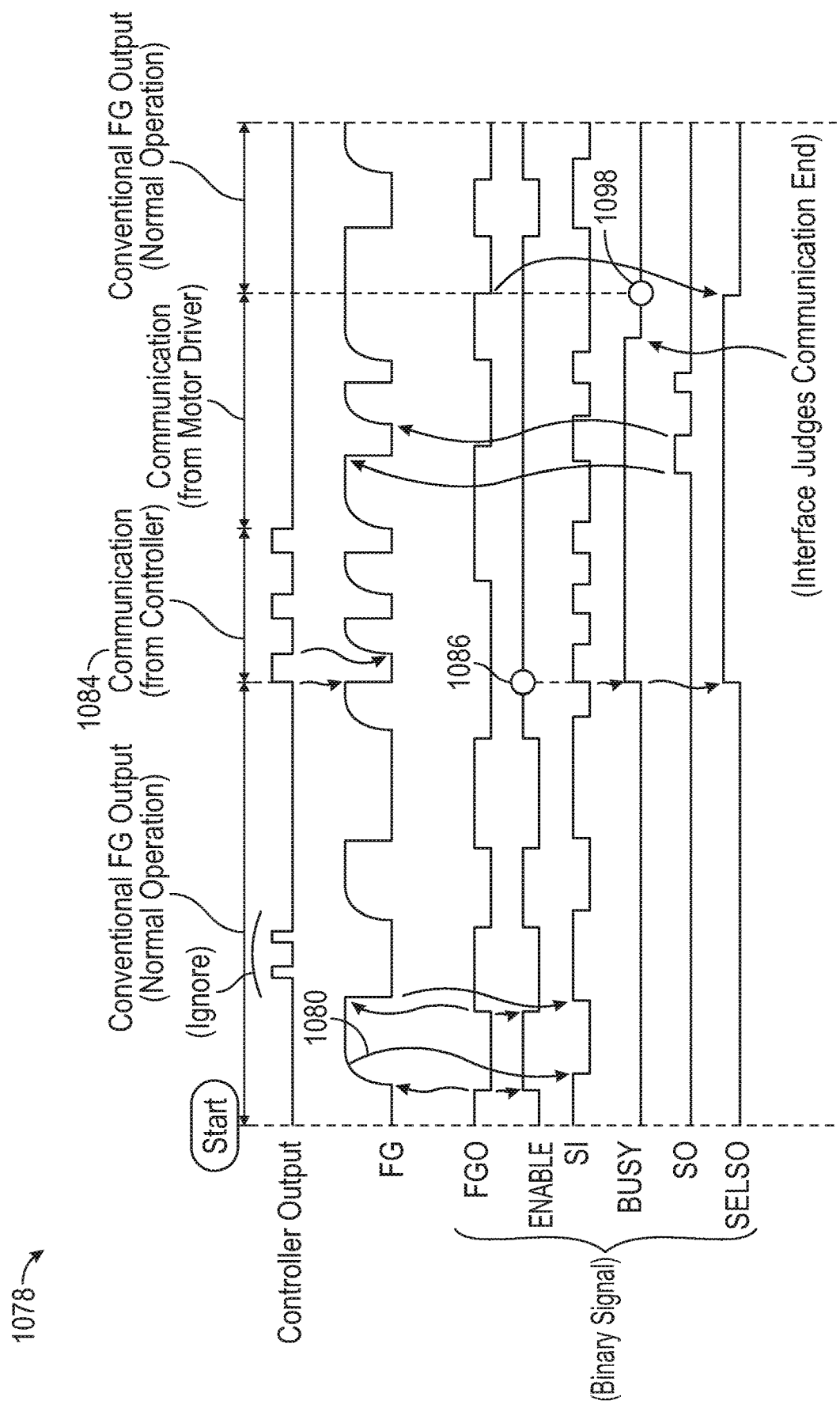
FIG. 20 is a timing diagram of an implementation of various signals generated by a motor driver implementation.

At circle 1088 in FIG. 19, the state is {H, L, L}. As indicated in truth table 1074, this state enables the interface 1056. The edge detector in interface 1056 then evaluates the SI signal. In the system implementation illustrated in FIGS. 11, 12, 19, and 20, the particular edge detector used is a positive edge detector (which will be described in detail later in this document). The positive edge detector generates a signal when it detects the rising edge of the SI signal. At a certain point in time, the controller 1046 sends a predefined signal to the motor driver 1044 (see FIG. 20, communication from controller signal 1084) using the multipurpose pin 1048. The predefined signal can be, non-limiting example, a single pulse, multiple pulses, a frequency modulation, multiple frequency modulations, any combination thereof, or any other signal type. In some implementations, the predefined signal may not include any data; in others, the predefined signal may include at least some data or may include all data. The effect of the predefined signal on the pattern of the FG signal is represented in FIG. 20, and has the effect of modulating the frequency (or amplitude [or both]) of the FG signal. The modulation of the FG signal results in the ENABLE signal being maintained at the high level by the enable signal generator 1058 (see the signal level following circle 1086 marking the beginning of controller communication). As indicated in FIG. 19, where the FGO level remains low and a positive edge is detected in the SI signal, then the system transitions to the state in circle 1090 where the busy signal generator in the interface 1056 produces a high BUSY signal, {H, H, L}. This transition takes place at the point in FIG. 20 marked 1086.

During normal operation, if the edge detector detects a positive edge in the SI signal and the FGO signal is high, the system transitions to the {L, H, L} state (circle 1096). The state change from {H, L, L} to {L, H, L} occurs when communication from the controller starts at the same time the FGO signal switches to a high value. At this point the communication start is ignored and the system transitions to the {L, L, L} state (circle 1082) immediately. Therefore, in order to ensure a stabilized communication, it is preferred that the controller starts communication immediately after that FG signal switches from low to high (FGO signal switches from high to low).

When the motor driver 1044 has detected the presence of communication from the controller through recognizing the predefined signal in the FG signal. Following transition to the {H, H, L} state, the selection signal generator generates a high SELSO signal in response to receiving the high BUSY signal, and the system then transitions to state {H, H, H} (circle 1092 in FIG. 19). At this point, motor driver 1044 is in a communication ongoing state monitored by the interface 1056. In this state, communication from the controller 1046 is ongoing. Note that FIG. 20 indicates that during this entire period of transition into communication with the controller 1046, the FG signal has continued to be provided by multipurpose pin 1048 which continues to allow the motor driver to operate normally during the communication period. Because of this, the same multipurpose pin can be used to provide the FG signal and receive the communication from (and to) the controller.

As illustrated in FIG. 20, after the communication from the controller has concluded, the motor driver 1044 will remain in the {H, H, H} state until the interface detects that communication has ended between the controller and the motor driver 1044. In various implementations, the interface determines/judges the communication end using predetermined criteria, such as, by non-limiting example, the passage of a predetermined period of time with no change of the SI and SO signal. At that point, the system transitions to the {H, L, H} state (circle 1094), where the busy signal generator changes the BUSY signal to a low state, indicating that the communication is no longer occurring. However, before the system transitions out of the state in circle 1094, three possible destinations in the flow chart are available. These three possible states/transitions/destinations permit the system to be able to work during a synchronization period to step the system from the communication period back into normal operating mode without disrupting the FG signal being provided over the multipurpose pin 1048. The first possibility is that the interface detected the end of the communication at the timing of FGO=H, and the next communication from the controller starts with the FGO signal level unchanged. This situation is indicated by the FGO signal remaining high and the edge detector still providing a positive edge signal. If this condition is detected, the system transitions back into the {H, H, H} state, preventing the communication from being disrupted. If the FGO signal is low but the edge detector still detects a positive edge, then the system transitions back to the {H, H, L} state (circle 1090 in FIG. 19). The state change from {H, L, H} to {H, H, L} occurs in two possible cases. The first is where the interface judges communication from the controller ending at the timing of FGO=H, and the next communication from the controller starts at the same time as the FGO signal's change to L. The second situation is where the interface judges the end of communication from the controller at the time where FGO=L, and the next communication from the controller is then detected by the interface immediately.

If the FGO signal is in the low state and no positive edge is detected in the SI signal, then the system transitions from the {H, L, H} to the {H, L, L} state (circle 1088). This transition may occur in two situations. The first is where the interface judges the communication from the controller as ending as FGO transitions from H to L without another communication being detected as starting from the controller. The second situation is where the interface determines that the communication has ended at the time where FGO=L and a subsequent communication from the controller is not detected by the interface immediately.

The transition from the {H, L, H} state to the {H, L, L} state is marked in FIG. 20 at circle 1098. Note that the system has period of time after which the BUSY signal goes to a low level before the system transitions fully back to normal operating mode. This period of time in various implementations is included in the synchronization period previously discussed. The use of various logic states of the motor driver 1044 permits the system to use the multifunction pin to provide the FG signal continuously and step into and out of data communication with the controller as needed by the system.

Figure 16:
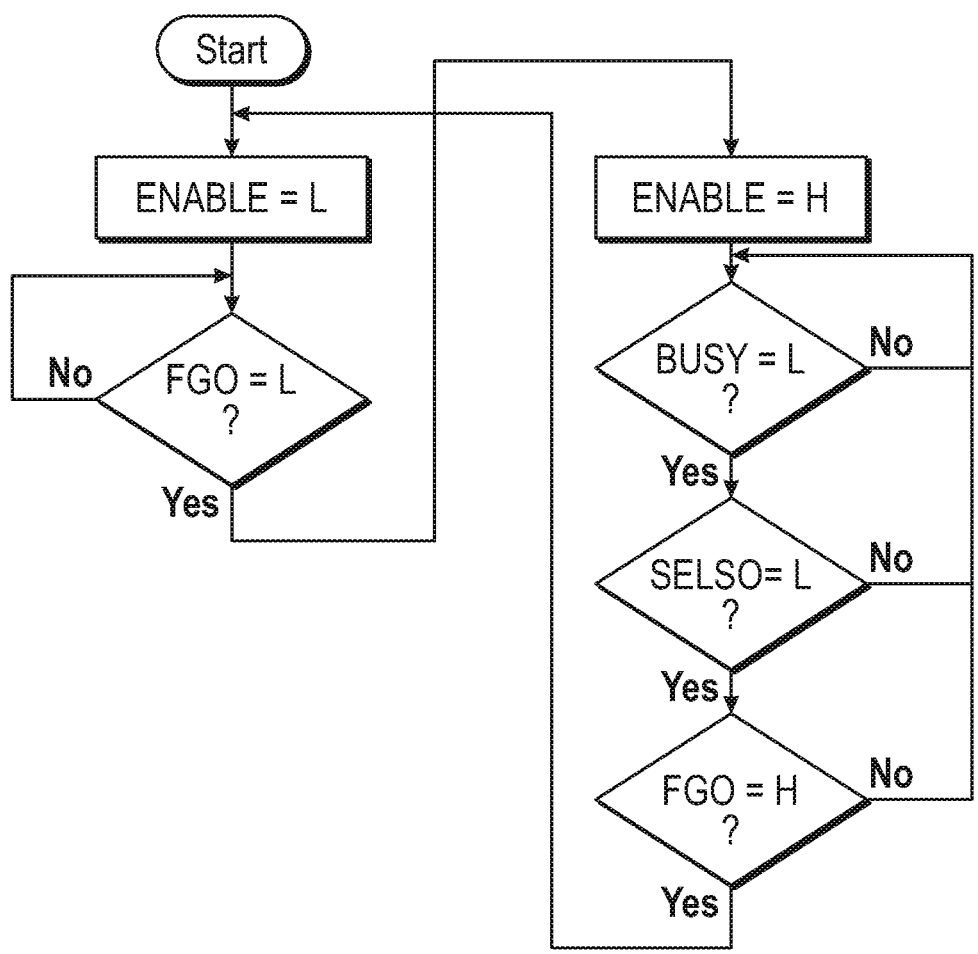
FIG. 16 is a flowchart of an implementation of a method of operation of a motor driver.
Figure 17:
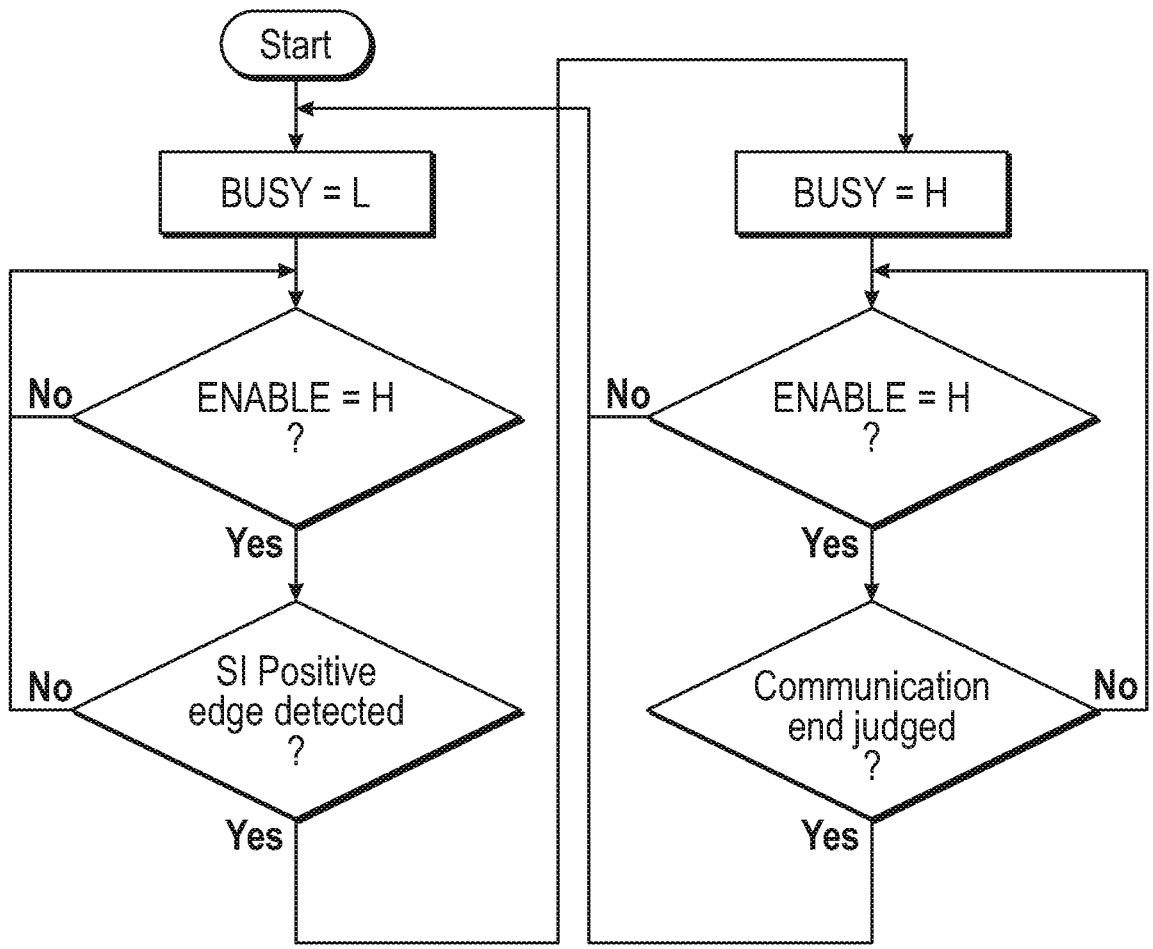
FIG. 17 is a flowchart of an another implementation of a method of operation of a motor driver.
Figure 18:
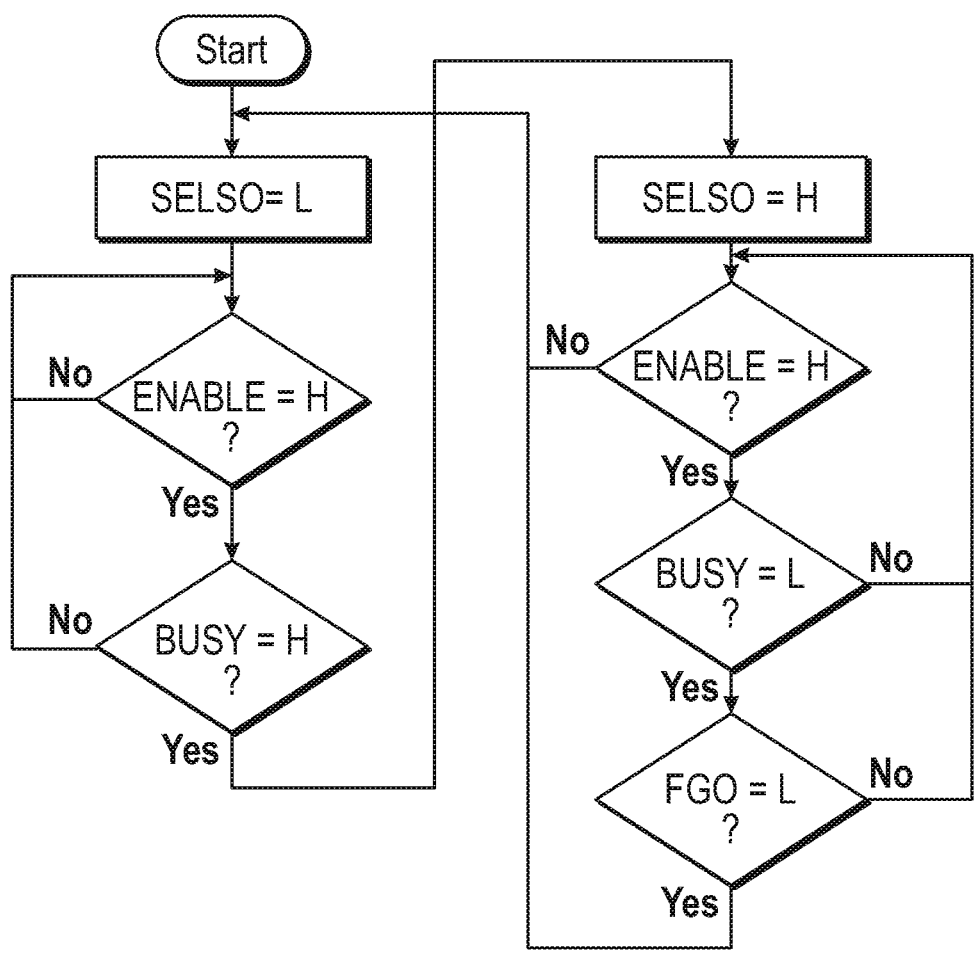
FIG. 18 is a flowchart of an another implementation of a method of operation of a motor driver.

FIGS. 16, 17, and 18 are flowcharts illustrating method implementations showing the logic flow into and out of communication using the multipurpose pin 1048. FIG. 16 shows a flowchart 1156 where the ENABLE signal starts out a low value and the logical and signal conditions for setting ENABLE to high (and back to low). FIG. 17 illustrates a flowchart 1158 where the BUSY signal starts out at a low value and the logical and signal conditions for setting BUSY to high. FIG. 18 illustrates a flowchart 1160 where the SELSO signal starts out a low value and the logical and signal conditions for setting SELSO to high. In combination, these three flowcharts 1156, 1158, and 1160 work together to set the ENABLE, BUSY, and SELSO signals to high simultaneously to allow communication to take place (and to set the appropriate BUSY and SELSO to low values to end communication).

The internal functions/structures of the various system modules will now be discussed in greater detail in the remainder of this document.

Figure 13:
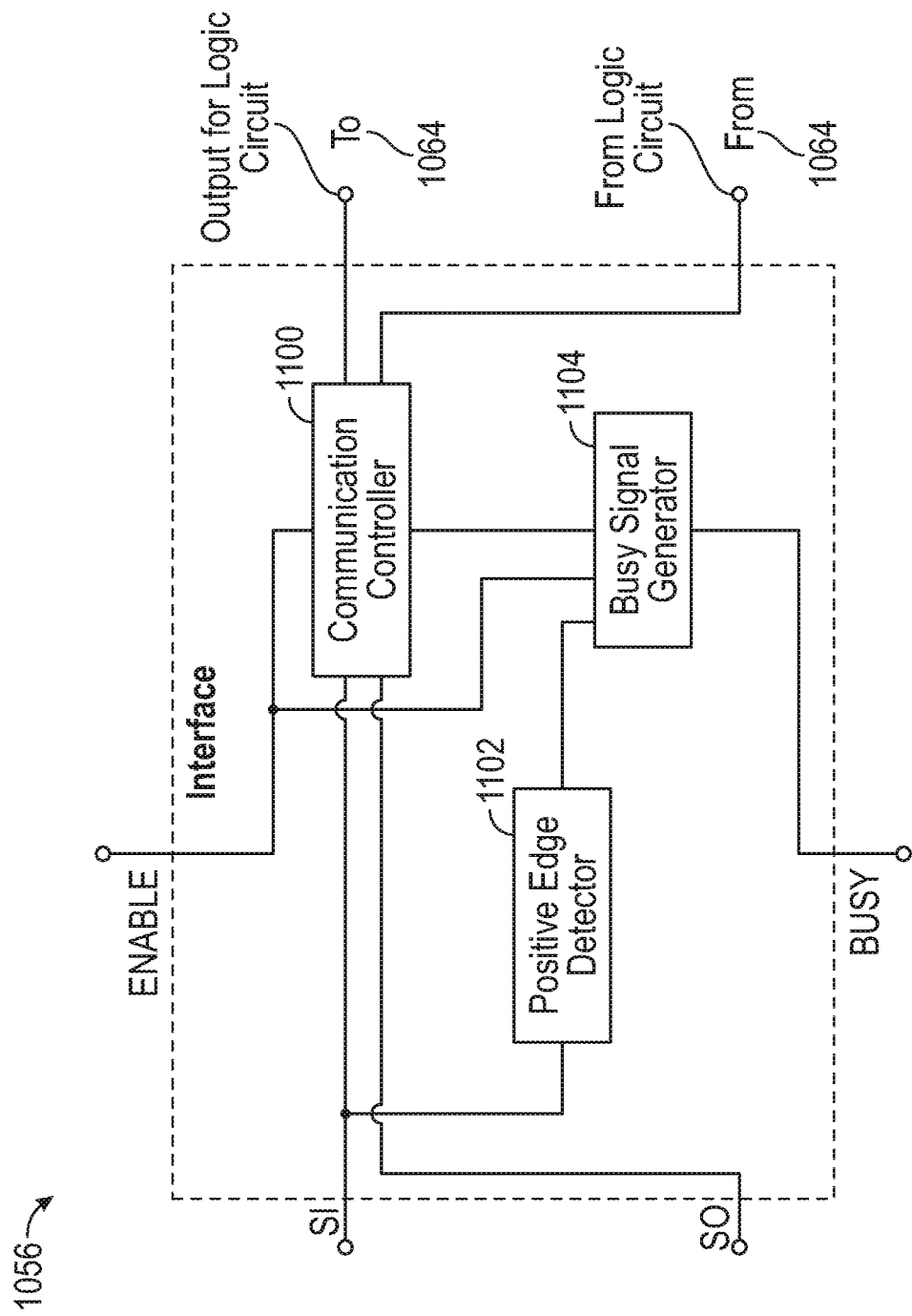
FIG. 13 is a block diagram of an implementation of a motor interface.
Figure 21:
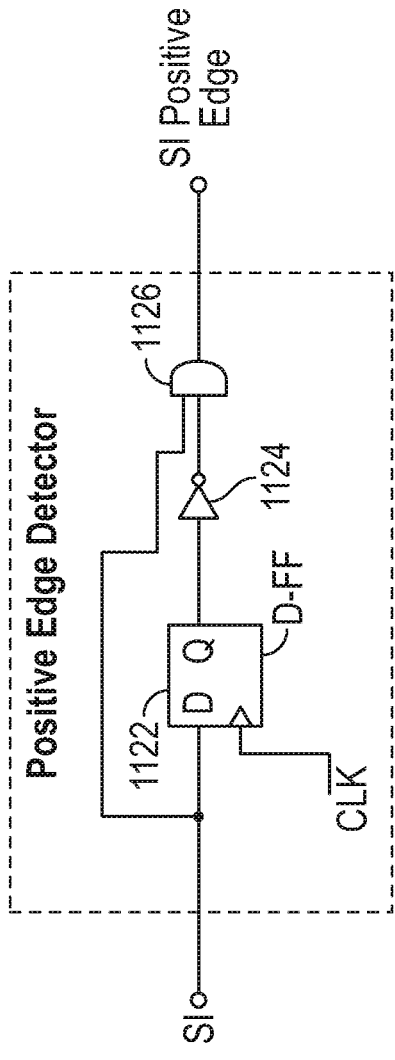
FIG. 21 is a schematic diagram of an implementation of a positive edge detector.

Referring to FIG. 13, a block diagram of an implementation of an interface 1056 is illustrated. In various implementations, the interface 1056 includes a communication controller 1100, a positive edge detector 1102, and a busy signal generator 1104 coupled together. The communication controller 1100 is coupled with the ENABLE signal from the enable signal generator 1058, the SI signal from inverter 1052, and has outputs that provide signals to the busy signal generator 1104 and for the SO signal. The positive edge detector 1102 is coupled to SI signal from inverter 1052 and outputs a signal to the busy signal generator 1104. The busy signal generator 1104 receives the output of the communication controller 1100, the positive edge detector 1102, and the ENABLE signal and then outputs the BUSY signal. To make the various determinations, the communication controller 1100 may include or implement any suitable processing components or devices such as digital logic gates, a microcontroller, or any other signal processing system and/or method. Based on the input, the positive edge detector 1102 determines whether the edge of the signal is a positive edge (e.g., a rising edge) or a negative edge (e.g., a falling edge, in the case of negative edge detector). The positive edge detector 1102 may provide an output indicating whether a positive edge is detected in the input to the busy signal generator 1104. FIG. 21 illustrates an implementation of a positive edge detector 1120 which employs a flip-flop 1122 whose output is coupled via inverter 1124 to AND gate 1126. Since the SI signal is also ANDed with the output of the inverter 1124, the only point at which the output of the inverter 1124 and the SI signal are both high, causing the AND gate 1126 to output the SI positive edge signal, is when the SI signal is rising to a maximum. In other implementations, various circuit components designed to detect the falling edge of the SI signal may be employed to act as a falling edge detector. Like all the flip-flops disclosed herein, a clock input of the flip-flop 1122 (which is a D flip-flop illustrated here) is configured to receive a clock signal from any suitable clock source or clocking device.

Figure 22:
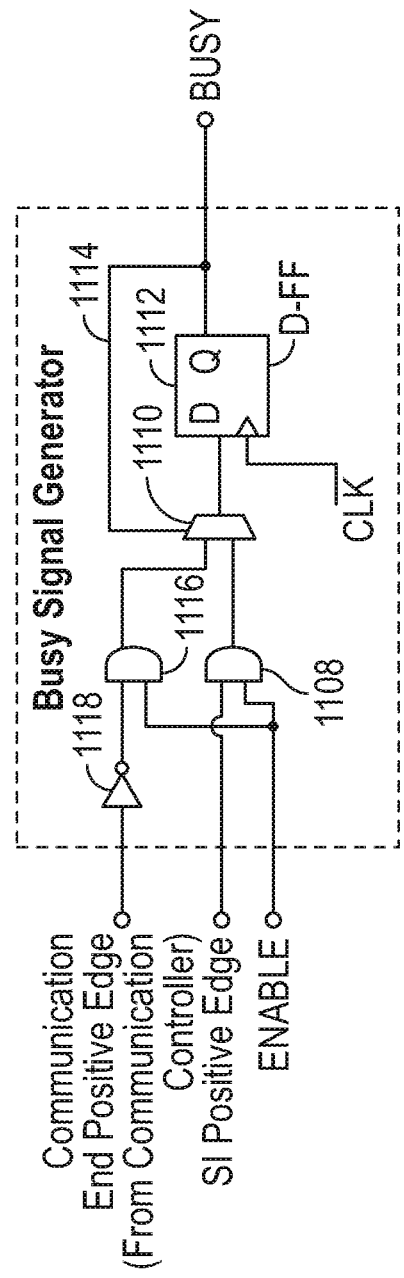
FIG. 22 is a schematic diagram of an implementation of a busy signal generator.

Referring to FIG. 22, an implementation of a busy signal generator 1106 is illustrated. As illustrated, the busy signal generator 1106 receives the output of the positive edge detector's evaluation of the SI signal and ANDs it with AND gate with the ENABLE signal. During operation, when the ENABLE signal is high and the edge detector detects a rising (or falling edge) in the SI signal, the AND gate 1108 outputs a signal to multiplexer 1110. Initially, multiplexer 1110 is set to pass the signal from AND gate 1108 to flip-flop 1112 (which is a D flip-flop in this implementation). The flip-flop 1112 then changes state in response, outputting the BUSY signal. Since the input 1114 of the multiplexer 1110 is coupled with the output of the flip-flop 1112, the multiplexer 1110 then switches to receive as its input the output of the second AND gate 1116. Second AND gate 1116 receives the inverted output of the communication controller's detection of the positive edge of the communication end via inverter 1118 and ANDs it with the ENABLE signal. As a result, when the communication end is detected by the communication controller's edge detector, since the ENABLE signal is still high from the ongoing communication, the second AND gate 1116 outputs a signal to multiplexer 1110. Multiplexer 1110 then outputs the signal, causing flip-flop 1112 to change stage and set the BUSY signal to low while simultaneously resetting the multiplexer back to the output of the first AND gate 1108 (allowing the busy signal generator to be ready to generate the high BUSY signal again).

Figure 14:
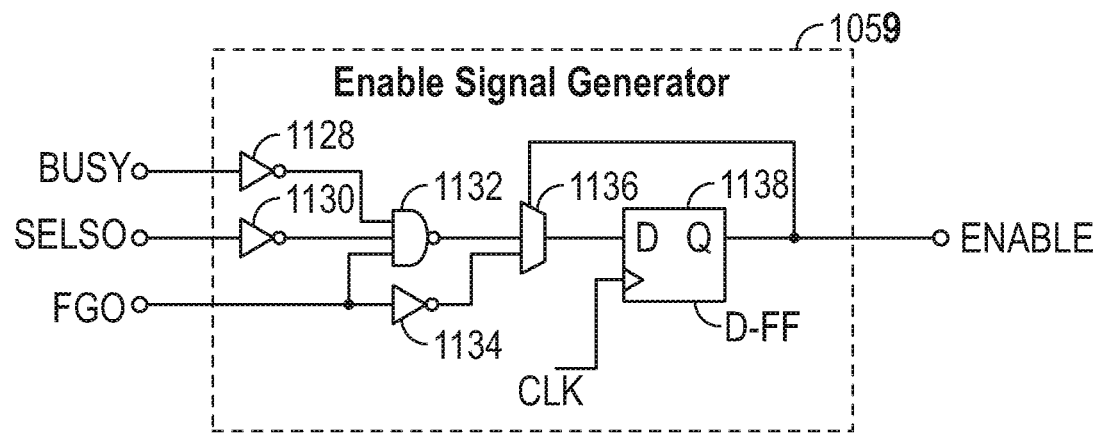
FIG. 14 is a schematic diagram of an implementation of an enable signal generator.

Referring to FIG. 14, a schematic diagram of an implementation of an enable signal generator 1059 is illustrated. In various implementations, the enable signal generator 1059 includes a first inverter 1128, a second inverter 1130, a not-AND (NAND) gate (digital logic gate) 1132, a third inverter 1134, a multiplexer 1136, and a flip-flop 1138 (which is a D flip-flop in this implementation). The first inverter's input 1128 is coupled with the BUSY signal from the busy signal generator 1106. The output of the first inverter 1128 is coupled to a first input of the NAND gate 1132. The second inverter's 1130 input is coupled to the SELSO signal from the selection signal generator 1054. The output of the second inverter 1130 is coupled to a second input of the NAND gate 1132. A third input of the NAND gate 1132 is coupled to the FGO signal from the FG logic unit 1060. The output of the NAND gate 1132 is coupled to a first input of the multiplexer 1136. The third inverter 1134 is coupled to the FGO signal and its output is coupled to a second input of the multiplexer 1136. The output of the multiplexer 1136 is coupled to a data input of flip-flop 1138 (which is a D flip-flop in this implementation). The output of the flip-flop 1138 is coupled to a control input of the multiplexer 1136 and provides the ENABLE signal from the enable signal generator Like all the flip-flops disclosed herein, a clock input of the D flip-flop 1138 is configured to receive a clock signal from any suitable clock source or clocking device.

Figure 15:
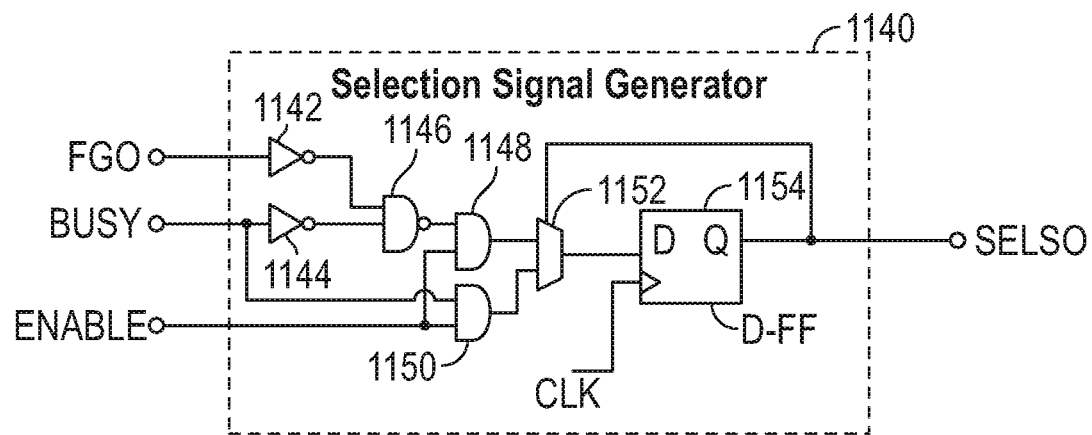
FIG. 15 is a schematic diagram of an implementation of a selection signal generator.

Referring to FIG. 15, a schematic diagram of an implementation of a selection signal generator 1140 is illustrated. In the particular implementation illustrated, the selection signal generator 1140 includes a first inverter 1142, a second inverter 1144, a NAND gate 1146, a first AND gate 1148, a second AND gate 1150, a multiplexer 1152, and a flip-flop 1154 (which is a D flip-flop in this implementation). The first inverter's 1142 input is coupled to the FGO signal and its output is coupled to a first input of the NAND gate 1146. The second inverter's 1144 input is coupled to the BUSY signal and its output is coupled to a second input of the NAND gate 1146. The NAND gate 1146 has an output coupled to a first input of the first AND gate 1148. A second input of the first AND gate 1148 is coupled to the ENABLE signal and its output is coupled to a first input of the multiplexer 1152. A first input of the second AND gate 1150 is coupled to the BUSY signal and a second input of the second AND gate 1150 is coupled to the ENABLE signal. The output of the second AND gate 1150 is coupled to a second input of the multiplexer 1152. An output of the multiplexer 1152 is coupled to a data input of flip-flop 1154 and an output of the flip-flop 1154 is coupled to the control input of the multiplexer 1152. The output of the flip-flop 1154 forms the SELSO signal from the selection signal generator. A clock input of the flip-flop 1154 is configured to receive a clock signal from any suitable clock source or device.

In places where the description above refers to particular implementations of motor drivers, controllers, and implementing components, sub-components, methods and sub-methods, it should be readily apparent that a number of modifications may be made without departing from the spirit thereof and that these implementations, implementing components, sub-components, methods and sub-methods may be applied to other motor drivers and controllers.

What is claimed is:

1. A motor driver system, comprising:
a motor driver configured to couple with a motor, the motor driver comprising a multipurpose pin;
wherein the motor driver is configured to couple with a controller through at least the multipurpose pin;
wherein the motor driver, during an enable mode, is configured to receive serial data from the controller and to send serial data to the controller using the multipurpose pin during a normal operation mode of the motor driver; and
wherein the motor driver is configured to output a frequency generator (FG) signal to the controller using the multipurpose pin during the normal operation mode of the motor driver.

2. The system of claim 1, wherein the motor driver, at an end of the enable mode, is configured to wait during a synchronization period before terminating one of sending serial data to or receiving serial data from the controller.

3. The system of claim 1, wherein the motor driver further comprises:
an interface comprising:
a communication controller, an edge detector, and a busy signal generator operatively coupled together and coupled with an inverter, the inverter coupled with the multipurpose pin; and
a selection signal generator.

4. The system of claim 3, wherein the selection signal generator comprises:
a first inverter coupled with an output of a frequency generator logic unit;
a second inverter coupled with the output of the busy signal generator;
a first not-AND (NAND) gate having a first input coupled with an output of the first inverter and a second input coupled to an output of the second inverter;
a first AND gate having a first input coupled to an output of the first NAND gate and a second input coupled to an output of an enable signal generator;
a second AND gate having a first input coupled to the output of the busy signal generator and a second input coupled to the output of the enable signal generator;
a multiplexer having a first input coupled to the output of the first AND gate, a second input coupled to the output of the second AND gate, and a control input;
a flip-flop coupled to the output of the multiplexer and to an output coupled with the control input, the flip-flop configured to generate a selection signal generator output signal in response to receiving an output signal from the multiplexer.

5. The system of claim 3, wherein the busy signal generator comprises:
an inverter coupled with an output of the communication controller;
a first AND gate having a first input coupled with an output of the inverter and a second input coupled with an output of an enable signal generator;
a second AND gate having a first input coupled with an output of the edge detector and a second input coupled with the output of the enable signal generator;
a multiplexer coupled with an output of the first AND gate and an output of the second AND gate, the multiplexer having a control input; and
a flip-flop coupled with an output of the multiplexer, the flip-flop having an output coupled with the control input, the flip-flop configured to generate a busy signal output in response to receiving an output signal from the multiplexer.

6. The system of claim 1, wherein the motor driver further comprises an interface comprising:
a communication controller coupled with an output of an enable signal generator, a busy signal generator, an inverter, and an edge detector;
wherein the edge detector is a positive edge detector.

7. The system of claim 6, wherein the enable signal generator comprises:
a first inverter coupled with an output of the busy signal generator;
a second inverter coupled with an output of a selection signal generator;
a not-AND (NAND) gate comprising a first input coupled to an output of the first inverter, a second input coupled to an output of the second inverter, a third input coupled to an output of a frequency generator logic unit, and an output coupled with a multiplexer;
a third inverter comprising an input coupled to the output of the frequency generator logic unit and an output coupled with the multiplexer, the multiplexer comprising a control input and an output; and
a flip-flop comprising a data input coupled to the output of the multiplexer, and an output coupled to the control input of the multiplexer and an output of the enable signal generator, the flip-flop configured to generate an enable signal in response to receiving an output signal from the multiplexer.

8. A motor driver comprising:
a communication controller, an edge detector, an enable signal generator, a frequency generator logic unit, a selection signal generator, and a busy signal generator operatively coupled together and coupled with an inverter; and
a multipurpose pin coupled with the inverter;
wherein the motor driver is configured to couple with a controller through the multipurpose pin.

9. The system of claim 8, wherein the motor driver, during an enable mode, is configured to receive serial data from the controller and to send serial data to the controller using the multipurpose pin during a normal operation mode of the motor driver, and
wherein the motor driver is configured to output a frequency generator (FG) signal to the controller using the multipurpose pin during the normal operation mode of the motor driver.

10. The system of claim 9, wherein the motor driver, at an end of the enable mode, is configured to wait during a synchronization period before terminating one of sending serial data to or receiving serial data from the controller.

11. The system of claim 8, wherein the enable signal generator comprises:
a first inverter coupled with an output of the busy signal generator;
a second inverter coupled with an output of the selection signal generator;
a not-AND (NAND) gate comprising a first input coupled to an output of the first inverter, a second input coupled to an output of the second inverter, a third input coupled to an output of the frequency generator logic unit, and an output coupled with a multiplexer;
a third inverter comprising an input coupled to the output of the frequency generator logic unit and an output coupled with the multiplexer, the multiplexer comprising a control input and an output; and a flip-flop comprising a data input coupled to the output of the multiplexer, the flip-flop having an output coupled to the control input of the multiplexer and an output of the enable signal generator, the flip-flop configured to generate an enable signal in response to receiving an output signal from the multiplexer.

12. The system of claim 8, wherein the selection signal generator comprises:
a first inverter coupled with an output of the frequency generator logic unit;
a second inverter coupled with the output of the busy signal generator;
a first not-AND (NAND) gate having a first input coupled with an output of the first inverter and a second input coupled to an output of the second inverter;
a first AND gate having a first input coupled to an output of the first NAND gate and a second input coupled to the output of the enable signal generator;
a second AND gate having a first input coupled to the output of the busy signal generator and a second input coupled to the output of the enable signal generator;
a multiplexer having a first input coupled to the output of the first AND gate, a second input coupled to the output of the second AND gate, and a control input;
a flip-flop coupled to the output of the multiplexer and to an output coupled with the control input, the flip-flop configured to generate a selection signal generator output signal in response to receiving an output signal from the multiplexer.

13. The system of claim 8, wherein the busy signal generator comprises:
an inverter coupled with an output of the communication controller;
a first AND gate having a first input coupled with an output of the inverter and a second input coupled with an output of the enable signal generator;
a second AND gate having a first input coupled with an output of the edge detector and a second input coupled with the output of the enable signal generator;
a multiplexer coupled with an output of the first AND gate and an output of the second AND gate, the multiplexer having a control input; and
a flip-flop coupled with an output of the multiplexer and having an output coupled with the control input, the flip-flop configured to generate a busy signal output in response to receiving an output signal from the multiplexer.

14. A method of driving a motor, the method, comprising:
providing a motor driver configured to couple with a motor, the motor driver comprising a multipurpose pin, the multipurpose pin configured to couple a controller with the motor driver through at least the multipurpose pin;
using the motor driver, receiving serial data from the controller using the multipurpose pin and sending serial data to the controller using the multipurpose pin during a normal operation mode of the motor driver, and
outputting a frequency generator (FG) signal to the controller using the multipurpose pin during the normal operation mode of the motor driver.

15. The method of claim 14, further comprising waiting, using the motor driver at an end of an enable mode, during a synchronization period before terminating one of sending serial data to or receiving serial data from the controller.

16. The method of claim 14 wherein receiving serial data from the controller further comprises:
beginning serial transmission of data by first setting an ENABLE signal to high, followed by simultaneously setting a BUSY signal to high, and a Selection Signal Generator Output (SELSO) to high.

17. The method of claim 14, wherein sending serial data to the controller further comprises:
first setting a BUSY signal to low and setting a Selection Signal Generator Output (SELSO) to low while an ENABLE signal to low thereby creating a synchronization period between when serial data transmission ends and the normal operation mode of the motor driver begins.

18. The method of claim 14, wherein an interface is coupled with the multipurpose pin where the interface is configured to sense a beginning of serial data communication to the controller and sense an ending of serial data communication to the controller; and
the interface is configured to synchronize the serial data communication with the FG signal transmitted by the multipurpose pin during the beginning and ending of serial data communication using the interface.

19. The method of claim 18, wherein the interface comprises an edge detector configured to sense an edge of the FG signal.

20. The method of claim 19, further comprising:
providing an output of the edge detector to a busy signal generator;
setting a BUSY signal to one of a HIGH value or a LOW value in response to the output of the edge detector using the busy signal generator; and
using the BUSY signal to create a synchronization period between when serial data transmission ends and the normal operation mode of the motor driver begins.

* * * * *